(12) United States Patent
Kamiya et al.

(10) Patent No.: US 8,744,424 B2
(45) Date of Patent: Jun. 3, 2014

(54) PORTABLE TERMINAL, METHODS, PROGRAMS AND STORAGE MEDIA FOR PROGRAM STARTUP MANAGEMENT

(75) Inventors: Dai Kamiya, Tokyo (JP); Kazuhiro Yamada, Yokohama (JP); Takashi Kondo, Tokyo (JP); Naoki Yamane, Tokyo (JP); Yutaka Sumi, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1544 days.

(21) Appl. No.: 11/932,398

(22) Filed: Oct. 31, 2007

(65) Prior Publication Data

US 2008/0066089 A1 Mar. 13, 2008

Related U.S. Application Data

(62) Division of application No. 10/515,395, filed as application No. PCT/JP03/06218 on May 19, 2003.

(30) Foreign Application Priority Data

May 20, 2002 (JP) .................................. 2002-145281

(51) Int. Cl.
*H04M 3/00* (2006.01)
(52) U.S. Cl.
USPC ........... 455/418; 455/410; 455/411; 455/419; 455/426.1; 455/412; 713/2; 713/185
(58) Field of Classification Search
USPC .............. 455/410, 411, 418–420, 26.1, 412.1
See application file for complete search history.

(56) References Cited

U.S. PATENT DOCUMENTS

| | | | | |
|---|---|---|---|---|
| 6,125,447 A | * | 9/2000 | Gong | 726/17 |
| 6,766,353 B1 | * | 7/2004 | Lin et al. | 709/203 |
| 6,980,213 B1 | | 12/2005 | Hirose et al. | 345/467 |
| 7,165,249 B2 | * | 1/2007 | Potter et al. | 717/174 |
| 7,174,333 B2 | * | 2/2007 | Yamada et al. | 1/1 |
| 7,356,569 B1 | | 4/2008 | Kembel et al. | 709/217 |
| 2002/0019941 A1 | * | 2/2002 | Chan et al. | 713/185 |

(Continued)

FOREIGN PATENT DOCUMENTS

| | | | | |
|---|---|---|---|---|
| CN | 1523481 A | 8/2004 | | G06F 3/033 |
| CN | 1656448 A | 8/2005 | | G06F 9/44 |

(Continued)

OTHER PUBLICATIONS

Office Action from the European Patent Office, Application No. 03 730 523.2-1243, mailing date of Apr. 15, 2008.

(Continued)

*Primary Examiner* — Lester Kincaid
*Assistant Examiner* — Mehmood B Khan
(74) *Attorney, Agent, or Firm* — Brinks Gilson & Lione

(57) ABSTRACT

An IP server sends e-mail to a mobile device MS. This e-mail includes an application specifier that specifies startup of a Java application stored in mobile device MS. On the other hand, the ADF for the Java application stored in mobile device MS includes trusted source data containing a plurality of e-mail addresses that indicate trusted origins. Mobile device MS compares the e-mail transmission origin address with the trusted source data. Mobile device MS, only in the case where the transmission origin address of the received e-mail is included in the trusted source data, starts up a Java application based on an application specifier included in said e-mail.

28 Claims, 16 Drawing Sheets

(56) References Cited

U.S. PATENT DOCUMENTS

| | | | |
|---|---|---|---|
| 2002/0078380 A1* | 6/2002 | Lin et al. | 713/201 |
| 2003/0060189 A1 | 3/2003 | Minear et al. | |
| 2003/0070070 A1* | 4/2003 | Yeager et al. | 713/157 |
| 2004/0054886 A1* | 3/2004 | Dickinson et al. | 713/153 |
| 2004/0141016 A1 | 7/2004 | Fukatsu et al. | 345/856 |
| 2006/0101514 A1 | 5/2006 | Milener et al. | 726/22 |
| 2006/0129628 A1 | 6/2006 | Kamiya et al. | 709/203 |
| 2006/0248168 A1 | 11/2006 | Nishimura et al. | 709/219 |
| 2008/0287098 A1 | 11/2008 | Kim | 455/407 |
| 2009/0109959 A1* | 4/2009 | Elliott et al. | 370/352 |
| 2010/0325626 A1* | 12/2010 | Greschler et al. | 717/176 |
| 2011/0138074 A1 | 6/2011 | Onda et al. | 709/245 |

FOREIGN PATENT DOCUMENTS

| | | | | |
|---|---|---|---|---|
| EP | 0 570 123 | A1 | 11/1993 | |
| EP | 1 132 796 | A1 | 9/2001 | |
| JP | 6-103058 | A | 4/1994 | |
| JP | H11-110219 | A | 4/1999 | |
| JP | 2000-276471 | | 10/2000 | G06F 17/30 |
| JP | 2001-117769 | A | 4/2001 | |
| JP | 2001-156942 | A | 6/2001 | |
| JP | 2001-333155 | A | 11/2001 | |
| JP | 2002-091850 | A | 3/2002 | |
| JP | 2004-046478 | | 2/2004 | G06F 17/30 |
| JP | 2004-178512 | | 6/2004 | G06F 3/14 |
| JP | 2005-004631 | | 1/2005 | G06F 13/00 |
| JP | 2005-032041 | | 2/2005 | G06F 3/00 |
| JP | 2005-339045 | | 12/2005 | G06F 17/60 |
| JP | 2006-172463 | | 6/2006 | G06F 21/22 |
| JP | 2006-285844 | | 10/2006 | G06F 21/20 |
| KR | 10-2006-0088850 | | 8/2006 | H04B 7/14 |
| KR | 10-2006-0124542 | | 12/2006 | H04Q 7/38 |
| WO | WO 99/30217 | A1 | 6/1999 | |
| WO | WO 00/65763 | A2 | 11/2000 | |

OTHER PUBLICATIONS

Office Action issued Apr. 30, 2008 in Japanese patent application No. 2002-145281 (with translation).

Kinoshita, Y., "Mail Client, NOBITAMAIL, Intercom", Java World, Kabushiki Kaisya IDG Communications, Oct. 1, 1998, vol. 2, No. 10, pp. 52-54 (with concise explanation).

Tanaka, "Jissen Nyumon HTML E Mail, Oh! PC", Softbanc Corp., Mar. 1, 1999, vol. 17, No. 11, pp. 161-166 (with concise explanation).

EP Search Report dated Aug. 14, 2007 in EP patent application No. 03730523.2.

Japanese Office Action, dated Feb. 7, 2012, pp. 1-6, Japanese Patent Application No. 2007-033597, Japanese Patent Office, Japan.

International Search Report of the Japanese Patent Office as ISA for International Patent Application No. PCT/JP2008/052413, dated Apr. 15, 2008; 1 pg.

Sato, Kazuto, HTML MANIAX, Internet Magazine No. 96; Jan. 1, 2003; pp. 180-183, with concise explanation of relevance, and front/back covers of magazine: total of 8 pgs.; © 2003 impress corporation.

Office Action issued in corresponding Russian Patent Application No. 2009134159/09(048105), dated Dec. 15, 2010, with English translation, 9 pgs.

Bott, E.; Siechert, C.; "Microsoft Windows XP Inside Out," from Effective Work Windows XP, SPb., Piter, 2004, with English translation, 4 pgs.

Office Action issued in corresponding Korean Patent Application No. 10-2009-7016653, dated Jan. 14, 2011, with English translation, 11 pgs.

Office Action issued in corresponding U.S. Appl. No. 12/527,103, dated Jun. 13, 2011; 14 pgs.

Office Action issued in corresponding Russian Patent Application No. 2009134159/07(048105), dated Jul. 8, 2011, with English translation, 7 pgs.

Office Action issued in corresponding Korean Patent Application No. 10-2009-7016653, dated Sep. 30, 2011, with English translation, 6 pgs.

Office Action issued in corresponding Japanese Patent Application No. 2007-033597, dated Oct. 25, 2011, with English translation, 6 pgs.

Office Action issued in corresponding Chinese Patent Application No. 200880004902.5, dated Nov. 16, 2011, with English translation, 19 pgs.

Office Action issued in corresponding U.S. Appl. No. 12/527,103, dated Dec. 1, 2011; 12 pgs.

Office Action issued in corresponding U.S. Appl. No. 12/527,103, dated Jul. 10, 2012; 15 pgs.

Office Action issued in corresponding Chinese Patent Application No, 200880004902.5, dated Aug. 3, 2012; 35 pgs.; State Intellectual Property Office of China, Beijing, China.

* cited by examiner

FIG. 2

| Java APPLICATION | URI |
|---|---|
| ADF (Java APPLICATION A) | http://www.??.ne.jp/$$a |
| Jar FILE (Java APPLICATION A) | http://www.??.ne.jp/$$j |
| ADF (Java APPLICATION B) | http://www.??.ne.jp/%%a |
| Jar FILE (Java APPLICATION B) | http://www.??.ne.jp/%%j |
| ⋮ | ⋮ |

Received: from · · ·
Date: ?, ? ? 2000 10:06:28
From:?? <??@??.ne.jp>
To: aa@aa.ne.jp
Subject: DATA IMPORT
This is a multi-part message in
MIME format.
-=_NextPart_000_000B_01C0A0A
7.F7E5F7C0
Content-Type: text/enriched;
<MOVE> <param>"http://www.?
?.co.jp/##a"> </param> </MOVE>

| URI | MAIL ADDRESS |
|---|---|
| http://www.??.ne.jp/$$a | aa@aa.ne.jp |
| | bb@bb.ne.jp |
| | ⋮ |
| http://www.??.ne.jp/%%a | cc@cc.ne.jp |
| | ⋮ |
| ⋮ | ⋮ |

*FIG. 8*

| URI | MEMORY ADDRESS |
|---|---|
| http://www.##.ne.jp/$$a | #0001 |
| http://www.??.ne.jp/%%a | #0002 |
| http://www.%%.ne.jp/##a | #0003 |
| ⋮ | ⋮ |

TBL1

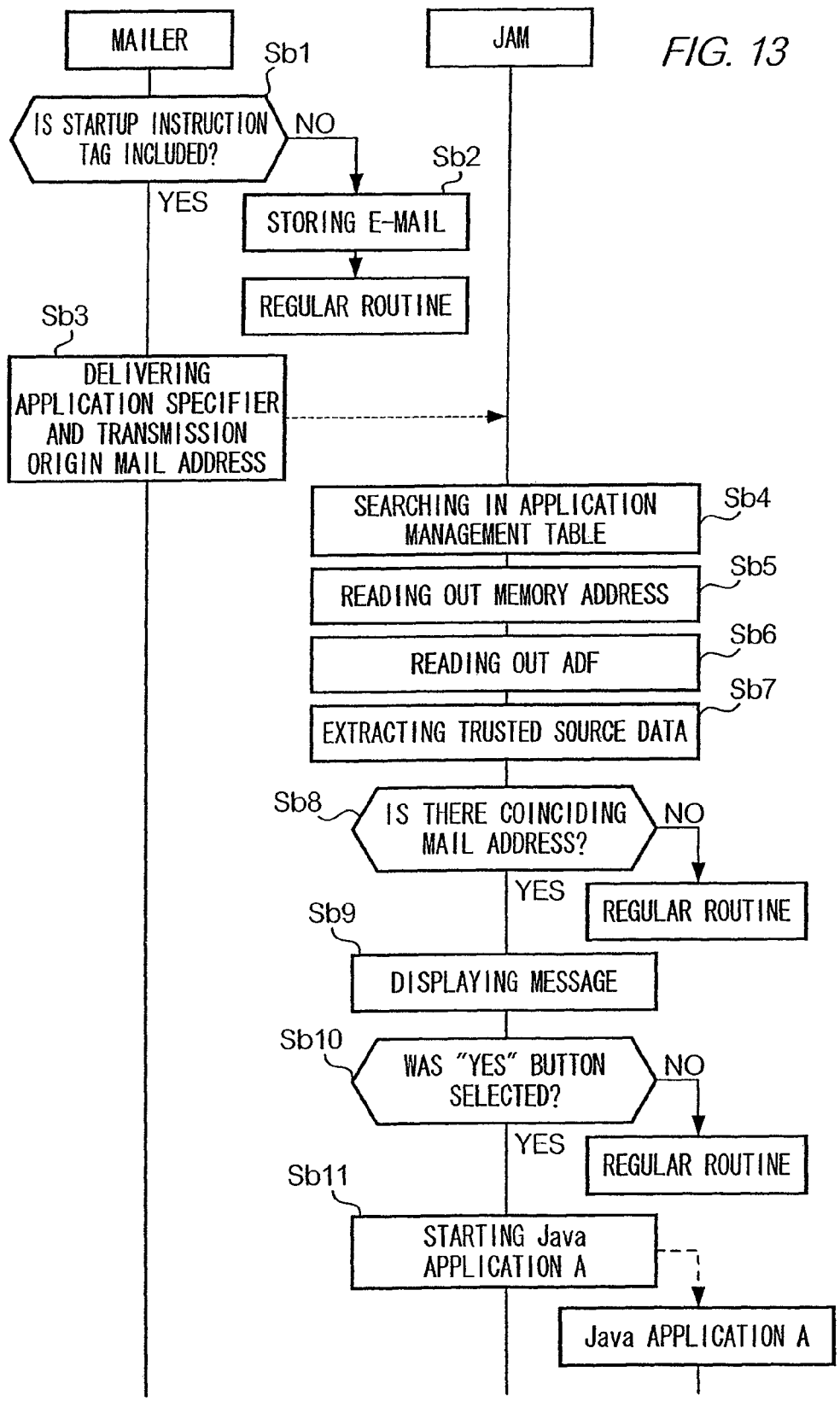

FIG. 14

```
<HTML>
<HEAD>
<TITLE>STARTUP INSTRUCTION PAGE</TITLE>
<META name="$$" content="$$">
</HEAD>
<BODY>
<CENTER>
<FONT size="-1"><BR>
SELECT THE CATALOG YOU'D LIKE TO SEE.</FONT><BR>
</CENTER>
<BR>
<A href="http://www.??.co.jp/$$a"> <IMG SRC="http://www.??.co.jp/.gif$$1> </A> <BR>
<MOVE"http://www.??.co.jp/$$a"> <IMG SRC="http://www.??.co.jp/.gif$$2> </MOVE> <BR>
<A href="http://www.??.co.jp/%%a"> <IMG SRC="http://www.??.co.jp/.gif%%1> </A> <BR>
<MOVE"http://www.??.co.jp/%%a"> <IMG SRC="http://www.??.co.jp/.gif%%2> </MOVE> <BR>
<A href="http://www.??.co.jp/??a"> <IMG SRC="http://www.??.co.jp/.gif??1> </A>   <BR>
<MOVE"http://www.??.co.jp/??a"> <IMG SRC="http://www.??.co.jp/.gif??2> </MOVE> <BR>
</BODY>
</HTML>
```

FIG. 15

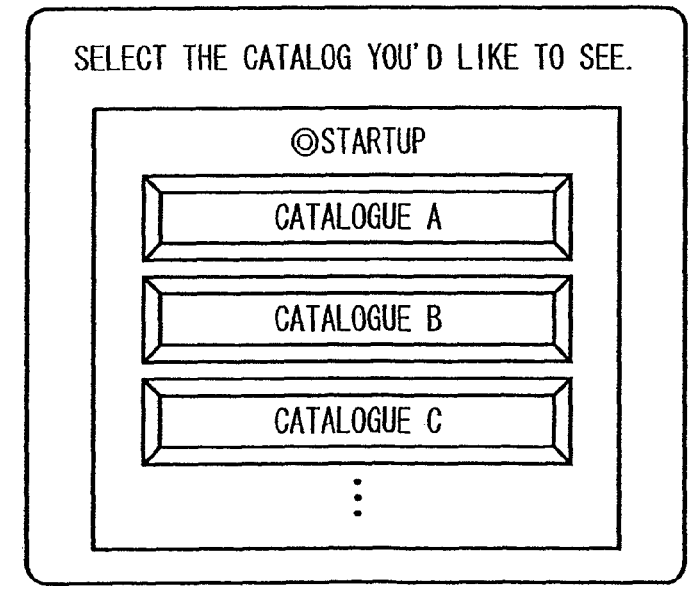

PORTABLE TERMINAL, METHODS, PROGRAMS AND STORAGE MEDIA FOR PROGRAM STARTUP MANAGEMENT

This application is a divisional application of U.S. patent application Ser. No. 10/515,395 filed May 19, 2003, which is nationalize PCT Application No. PCT/JP03/06218, which claims priority to Japanese Application No. 2002-145281 filed May 20, 2002, the entire contents of which are incorporated herein by reference.

TECHNICAL FIELD

This invention concerns portable terminals that manage startups of application programs.

BACKGROUND ART

Portable terminals such as mobile phones with packet communications capability can download various application programs (henceforth, "applications") from servers connected to the Internet, and execute the downloaded applications.

In recent years, accompanying the growth of networks like the Internet, many products with portable terminals can receive (henceforth "download") applications from other communication devices through networks.

DISCLOSURE OF THE INVENTION

With networks like the Internet, because they are open networks on which everyone has the capability to send and receive data, security isn't assured for downloaded applications.

Accordingly, if one permits a portable terminal to start up an application that was downloaded through an open network without restriction, the user, by executing the application in the portable terminal, may unintentionally send to an external communications device private data stored in the mobile terminal, causing an inconvenience, and compromising security.

Accordingly, operations of portable terminals according to the prior art are restricted so that the portable terminals cannot start other applications stored in the portable terminal in operations in accordance with an application that was provided through networks.

For example, portable terminals that store multiple applications written in Java (trademark) programming language, under the direction of the Java Application Manager (JAM), a control program that performs management of the startup of applications, etc., will not conduct the startup of other applications by a startup instruction by other applications.

In so doing, with the addition of controls that prevent the starting of other applications by a startup instruction by an application, the information security of the portable terminal is assured.

However, in this case, some inconveniences, such that it becomes difficult for making multiple applications share a series of operations, arise.

This invention, in view of the above problems, provides, with the aim of assuring security of information in starting applications in a portable terminal, the portable terminal, management methods, programs and storage media described below.

A 1st form of the present invention is a portable terminal comprising: receiving means that receives data from external electronic devices through wireless communications networks; storing means that stores (a) a plurality of applications including at least a first application and a second application, (b) source data that indicates sources of the plurality of applications respectively and (c) related data that has been related to the plurality of applications respectively; determining means that determines, in the case where related data related to the first application includes a startup instruction that instructs a startup of the second application, based on at least one of source data of the first application or source data of the second application, whether it is permissible to start the second application following the startup instruction; and executing means that, in the case where it has been determined by the determining means that it is permissible to start second application, executes startup operations for the second application.

A 2nd form of the present invention is a portable terminal according to the 1st form wherein: the storing means stores trusted source data that includes at least one set of source data that indicates a trusted source of applications; and the determining means conducts the determination based on source data of the first application and on the trusted source data.

A 3rd embodiment of the present invention is a portable terminal according to the 2nd form wherein: the storing means stores the trusted source data and the second application in an integrated form.

A 4th form of the present invention is a portable terminal according to the 1st form wherein: the storing means stores trusted source data that includes at least one set of source data that indicates a trusted source of applications; and the determining means conducts the determination based on source data of the second application and on the trusted source data.

A 5th form of the present invention is a portable terminal according to the 4th form wherein: the storing means stores the trusted source data and the first application in an integrated form.

A 6th form of the present invention is a portable terminal according to the 2nd or 4th form wherein: the storing means records a flag that distinguishes a part of source data that is included by the trusted source data from other parts of source data that is included by the trusted source data; and the determining means conducts the determination based on the flag.

A 7th form of the present invention is a portable terminal according to the 1st form wherein: the storing means stores untrusted source data that includes at least one set of source data that indicates an untrusted source of applications; and the determining means conducts the determination based on source data of the first application and on the untrusted source data.

An 8th form of the present invention is a portable terminal according to the 7th form wherein: the storing means stores the untrusted source data and the second application in an integrated form.

A 9th form of the present invention is a portable terminal according to the 1st form wherein: the storing means stores untrusted source data that includes at least one set of source data that indicates an untrusted source of applications; and the determining means conducts the determination based on source data of the second application and the untrusted source data.

A 10th form of the present invention is a portable terminal according to the 9th form wherein: the storing means stores the untrusted source data and the first application in an integrated form.

An 11th form of the present invention is a portable terminal according to the 1st form wherein: the receiving means receives related data related to the first application following instructions of the executing means in accordance with the first application.

A 12th form of the present invention is a portable terminal according to the 1st form wherein: the receiving means receives an application and transmission origin address data that indicates a location of a transmission origin of the application; and the storing means stores at least a part of the transmission origin address data as source data of the application.

A 13th form of the present invention is a portable terminal comprising: receiving means that receives data from external electronic devices through wireless communications networks; storing means that store (a) a plurality of applications including at least a first application and a second application, (b) related data that has been related to the plurality of applications respectively and (c) source data that indicates sources of the related data respectively; determining means that determines, in the case where related data related to the first application includes a startup instruction that instructs a startup of the second application, based on source data of the related data, whether it is permissible to start the second application following the startup instruction; and executing means that, in the case where it has been determined by the determining means that it is permissible to start second application, executes startup operations for the second application.

A 14th form of the present invention is a portable terminal according to the 13th form wherein: the storing means stores trusted source data that includes at least one set of source data that indicates a trusted source of related data; and the determining means conduct the determination based on source data of the first application and on the trusted source data.

A 15th form of the present invention is a portable terminal according to the 14th form wherein: the storing means stores the trusted source data and the second application in an integrated form.

A 16th form of the present invention is A portable terminal according to the 14th form wherein: the storing means records a flag that distinguishes a part of source data that is included by the trusted source data from other parts of source data that is included by the trusted source data; and the determining means conducts the determination based on the flag.

A 17th form of the present invention is a portable terminal according to the 13th form wherein: the storing means stores untrusted source data that includes at least one set of source data that indicates an untrusted source of related data; and the determining means conducts the determination based on source data of related data related to the first application and on the untrusted source data.

An 18th form of the present invention is A portable terminal according to the 17th form wherein: the storing means stores the untrusted source data and the second application in an integrated form.

A 19th form of the present invention is a portable terminal according to the 18th form wherein: the receiving means receives related data related to the first application following instructions of the executing means in accordance with the first application.

A 20th form of the present invention is a portable terminal according to the 19th form wherein: the receiving means receives an e-mail as related data that has been related to the first application.

A 21st form of the present invention is a portable terminal according to the 19th form wherein: the receiving means receives related data related to the first application and transmission origin address data that indicates a location of a transmission origin of the related data; and the storing means stores at least a part of the transmission origin address data as source data of the related data.

A 22nd form of the present invention is a portable terminal according to the 21st form wherein: the receiving means receives an e-mail as related data that has been related to the first application; and the storing means stores at least a part of a mail address that indicates a location of a transmission origin of the e-mail as source data of the related data.

A 23rd form of the present invention is a portable terminal according to the 1st, 2nd, 4th, 7th, 9th, 12th, 13th, 14th or 17th form wherein: the executing means creates, in operations executed in accordance with the first application, related data that is related to the first application.

A 24th form of the present invention is a portable terminal according to the 1st, 2nd, 4th, 7th, 9th, 12th, 13th, 14th or 17th form further comprising: acquiring means that acquires, before the executing means executes startup operations for the second application following startup instruction included in related data related to the first application, permission-prohibition data indicating whether it is permissible for the executing means to executes the startup operations, wherein the executing means executes, in the case where permission-prohibition data acquired by the acquiring means indicates that it is permissible for the startup operations to be executed, the startup operations.

A 25th form of the present invention is a portable terminal according to the 1st, 2nd, 4th, 7th, 9th, 12th, 13th, 14th or 17th form wherein: the receiving means receives, following an instruction of the executing means, indication data that indicates one of the plurality of applications; the executing means executes, in the case where the receiving means received, following an instruction of the executing means in accordance with the first application, indication data that indicates the second application, executes startup operations for the second application.

Moreover, the present invention provides methods for managing application startup that include, in portable terminal, operation steps which are executed by the above memory means, decision means, receiving means, acquisition means and execution means. Moreover, the present invention provides a program that performs instructions of operations which are executed, in the portable terminal, by the above memory means, decision means, receiving means, acquisition means and execution means using a computer. Moreover, the present invention provides a storage medium that stores the above program.

When a portable terminal, a management method, a program or a storage medium according to the present invention is used, it is determined whether it is permissible to start a second application following a startup instruction included in related data of a first application based on data that indicates source of the startup instruction, first application's source or second application's source; and the second application is started only in the case where it has been determined to be permissible.

Accordingly, a portable terminal according to the present invention can start an application stored in the portable terminal based on information indicating an application included in, for example, e-mail and HTML data and the like acquired from external telecommunications equipment through a network. As well, a portable terminal according to the present invention can start, following startup instruction created in accordance with an application, another application.

At that time, the portable terminal, based on data that indicates the source of the data that is specifying an application to be delivered or of the startup instruction, data that indicates the source of the application that instructs the startup, or data that indicates the source of the application that is instructed to start, determines whether it is permissible to perform startup of the application. As a result, the startup of application following data specifying the application that has been acquired from an untrusted source, and startup of application following an startup instruction created by applications that have been acquired from an untrusted source, are prevented. Accordingly, the information security of the portable terminal is assured.

BRIEF DESCRIPTION OF THE DRAWINGS

FIG. 2 is a diagram showing contents stored in an application DB for the first preferred embodiment of the present invention.

FIG. 3 is a diagram showing contents of an e-mail created by an IP server for the first preferred embodiment of the present invention.

FIG. 8 is a diagram showing contents stored in an application management table for the first preferred embodiment of the present invention.

FIG. 13 is a diagram showing operations performed by mobile device's CPU for the first preferred embodiment of the present invention.

FIG. 14 is a diagram showing contents of HTML data corresponding to a startup instruction page stored in an IP server for a second preferred embodiment of the present invention.

FIG. 15 is a diagram showing a screen shown in mobile device's display for the second preferred embodiment of the present invention.

PREFERRED EMBODIMENTS

Below, by reference to the diagrams, embodiments of this invention are described. Moreover, the embodiments below are for purposes of illustrating the invention, and the invention is not restricted to these. The invention can take on various other forms within the scope of its technical thoughts.

1: First Preferred Embodiment

[1.1: Composition]
[1.1.1: Composition of the System]

Figure 1:
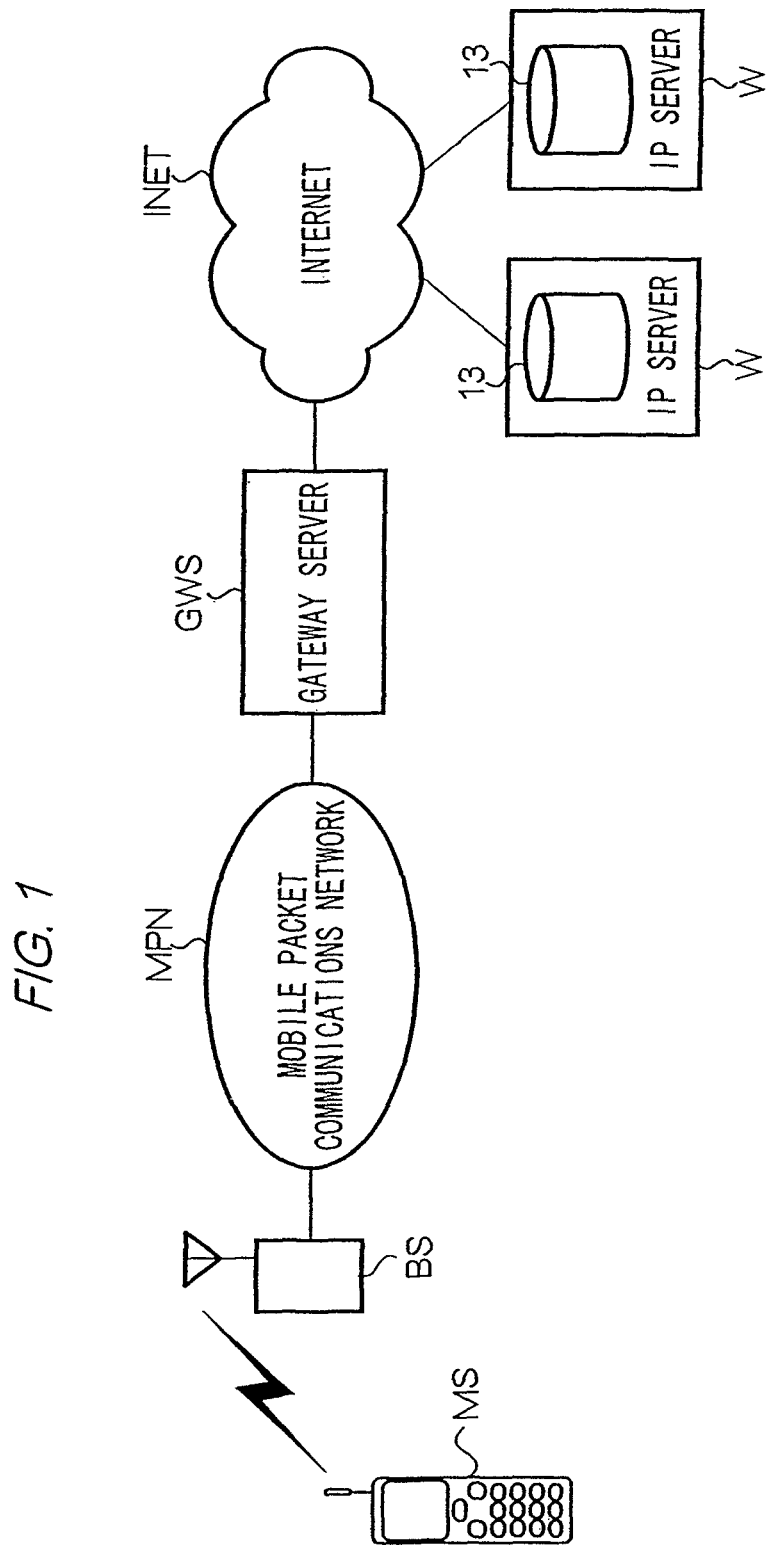
FIG. 1 is a block diagram showing a composition of a communication system for a first preferred embodiment of the present invention.

FIG. 1 is a block diagram that shows the composition of the communication system according to a first preferred embodiment of the present invention. The communication system for this preferred embodiment contains multiple mobile devices MS, multiple base stations BS, a mobile packet communications network MPN, a gateway server GWS, an internet INET, and multiple information provider (IP) servers W. FIG. 1, for the sake of simplicity of the figure, shows one mobile device MS, one base station BS and two IP servers W; however, all of these numbers are variable.

The mobile device MS is capable of the sending and receiving of various data between IP servers W, sequentially through a base station BS, the mobile packet communications network MPN, the gateway server GWS and the internet INET.

The IP server W contains a World Wide Web (WWW) server program and when it receives from mobile device MS a Hypertext Transfer Protocol (HTTP) message formatted as a GET method—a method that performs data's send request (hereinafter "GET request"), it can transmit to mobile device MS the data that has been requested by the GET request received in accordance with the WWW server program.

In the data held by IP server W there can be, for example, data in Hypertext Markup Language (HTML) format corresponding to various web pages (hereinafter "HTML data") and Java applications in the Java (registered trademark) programming language. As well, the Java application held by IP server W is divided into a JAR file that includes the body of the Java application and substantive data related to the Java application, and an Application Descriptor File (ADF) which is a text file including a name of the application and a Uniform Resource Identifier (URI) that indicates the storage location of the JAR file, and is stored in an application database 13 (hereinafter "database" is abbreviated as "DB").

Hereinafter, with this specification, as long as there is no need to especially distinguish the ADF and the JAR file, these will be mentioned together simply as "Java application". Moreover, in this embodiment, the Java application's ADF and JAR file are assumed to be stored together in IP server W; however, the ADF and the JAR file of the Java application may be stored separately in various distinct servers.

FIG. 2 is a figure that illustrates the contents of the data stored in application DB 13. As shown in the same figure, in application DB 13 according to the present invention, Java application's ADFs and JAR files held in IP server W are stored along with URIs each of which indicates a storage location of the file.

As well, the IP server W has a function that transmits to mobile device MS a startup instruction for a Java application downloaded from IP server W. In this embodiment, the IP server W contains a mailer, i.e., an application that performs the sending and receiving of e-mail; the IP server W creates e-mail to be provided to the mobile device MS that includes a startup instruction for a Java application, and by transmitting the e-mail to the mobile device MS in accordance with the mailer, it provides the startup instruction for a Java application stored in mobile device MS.

FIG. 3 is a figure that illustrates the contents of e-mail created by an IP server W. In particular, in FIG. 3, there is an instance of e-mail formatted according to the Multipurpose Internet Message Extension standard (MIME—see RFC2045/2046, etc.); however, if there are formats that can possibly include various data in e-mail, those other e-mail formats may also be used. As well, in FIG. 3, the header in e-mail with "From:??<@??.ne.jp>" created by IP server W is a header that includes the transmission origin address of the e-mail.

As well, in this e-mail, there is mentioned a character string "<MOVE><param>"http://www.??.co.jp/$$a"</param></move>". In this character string, the "<MOVE>" and "</MOVE>" construction is made up of tags that specify a Java application startup for mobile device MS (hereinafter "startup instruction tags") and, between these, the "<param>" and "</param>" construction (hereinafter "parameter tags"), which holds "http://www.??.co.jp/$$a" as its argument, is made up as an argument (See RFC1896). Here, the "http://www.??.co.jp/$$a" is information to specify the Java application that must be started (hereinafter "application specifier") in mobile device MS, and, in this embodiment the application specifier is assume to be a URI that indicates the download origin of the Java application's ADF.

Moreover, apart from the URI that shows the download origin of the ADF, any uniquely specifying information for the given Java application, e.g., the URI that indicates the JAR file download origin, may be used as its application specifier.

The mobile packet communications network MPN shown in FIG. 1 is a communications network for providing packet communications services for mobile devices MS. The mobile packet communications network MPN connects multiple base stations BS by wired communications, and base stations BS are capable of connection with mobile devices MS by wireless communications. The mobile packet communications network MPN is connected to the gateway server GWS. As well, the mobile packet communications network MPN includes packet service user management unit (not shown).

The gateway server GWS is a server apparatus established in a mobile packet gateway trunk exchange station that interconnects internet INET with mobile packet communications network MPN. After the gateway server GWS has rewritten the format of data received from internet INET into a format conforming to the protocol for data communications with the mobile packet communications network MPN, the GWS server transmits that data to mobile packet communications network MPN. Similarly, after the gateway server GWS has rewritten the format of data received from mobile packet communications network MPN to a format conforming to the protocol for data communication for internet INET, the server GWS transmits that data to internet INET.

In addition to the above functions, the gateway server GWS for this embodiment also contains a mail server function. The gateway server GWS receives e-mail addressed to mobile device MS, stores that received mail, and transmits that e-mail to the addressed mobile device MS (so-called "push" distribution.) When the transmission of e-mail is not successful, the gateway server GWS manages distribution of that e-mail to mobile device MS by, for example, retransmitting that e-mail for mobile device MS, after a set interval. Similarly, in the case where the gateway server GWS received, from the mobile device MS, e-mail addressed to IP server W, it transmits that e-mail to the addressed IP server W.

The mobile device MS is a portable electronic device such as a mobile phone device and is able to perform data communications between IP server W through base stations BS, a mobile packet communications network MPN, the gateway server GWS and the internet INET. Moreover, the mobile device MS is able to perform voice communications between landline telephones and the like (not shown), through base stations BS and the mobile phone network and other networks (not shown).

The mobile device MS has a WWW browser for composing web pages based on HTML data and the like, and displaying the web pages composed. When mobile device MS receives HTML data from IP server W, for example, it displays a web page based on the HTML data received in accordance with the WWW browser.

Moreover, the mobile device MS has a mailer and it can perform the sending and receiving of e-mail in accordance with the mailer. In e-mail that mobile device MS receives, as mentioned above, there is a case where a startup instruction tag is included. In that case the mobile device MS, based on the application specifier included between the startup instruction tags, starts the Java application indicated. With that result, the mobile device MS, based on the result of an operation for receiving e-mail in accordance with the mailer, can start a Java application other than the mailer. This operation is hereinafter called a "startup operation", the details of which are discussed below.

When mobile device MS is permitted to execute startup operation without any restriction, there is a case that produces information security problems. For example, mobile device MS may be ready to download a web page stored on a site on internet INET automatically when it performs operations in accordance with a Java application stored in mobile device MS. In that case, when mobile device MS starts up that Java application based on an application specifier included in e-mail transmitted from IP server W by a malicious third party, the user will unwittingly perform data communications with that internet site. With that result, the user may be inconvenienced with billed charges for communications services for services he or she does not remember. Similarly, while the user is unaware of it, a situation may arise posing an inconvenience of having private information stored in mobile device MS transmitted to an external communications device.

In this embodiment, for avoiding the above sorts of problems, each ADF of Java application includes a trusted source data and the mobile device MS, based on the data, determines whether executing startup operations according to the content of e-mail received is permissible.

The trusted source data includes at least one trusted transmission origin address for e-mail that concerns startup operations. The manager or the like of an IP server W, that is the supplier origin of the Java application, registered to that Java application's ADF as a trusted source data, e-mail transmission origin addresses that are considered to be reliable enough for that Java application to be started by an application specifier included in e-mail from the e-mail transmission origin addresses. The mobile device MS, in the case where startup instruction tags in e-mail received have been included, first extracts the trusted source data from the ADF of the Java application designated by the application specifier included between the startup instruction tags. Then, the mobile device MS determines whether the transmission origin address of the e-mail received is included in the trusted source data extracted. The mobile device MS starts that Java application only in the case where, in the trusted source data, the transmission origin address of the e-mail received has been included.

[1.1.2: IP Server Composition]

Figure 4:
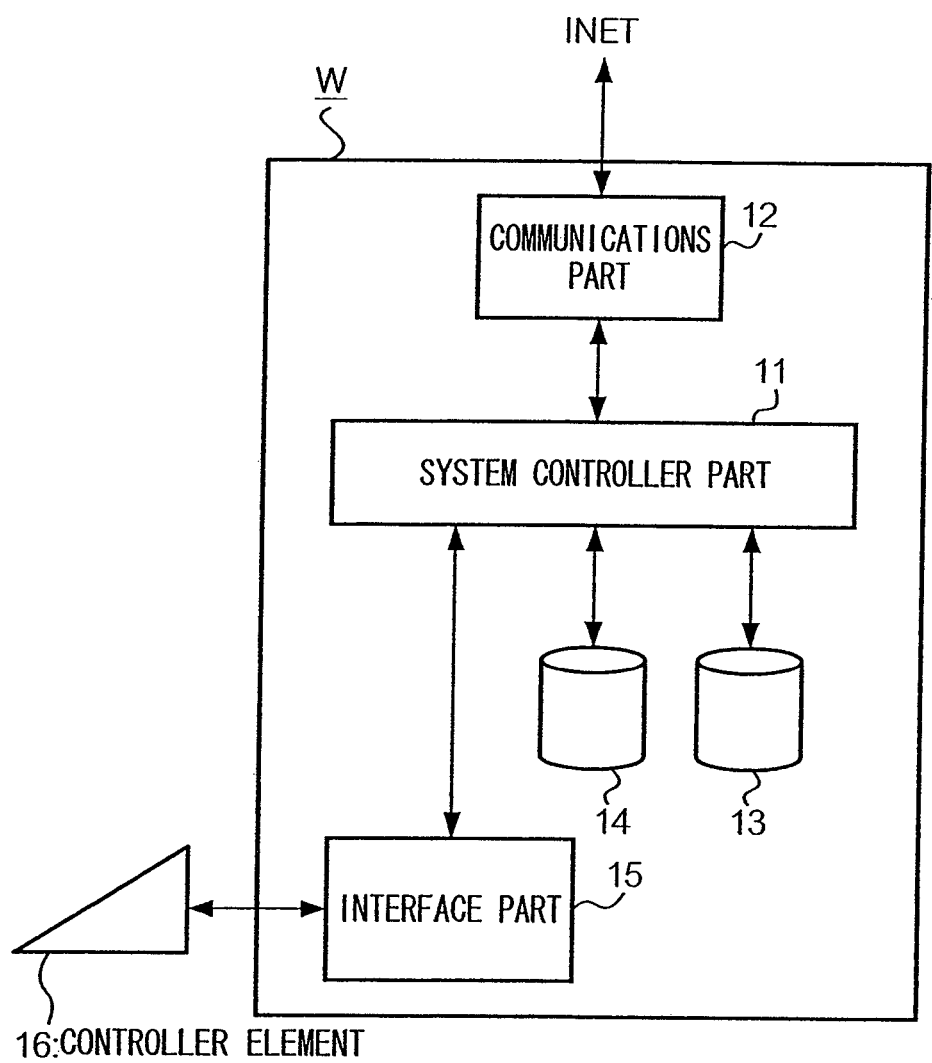
FIG. 4 is a block diagram showing a composition of an IP server for the first preferred embodiment of the present invention.

FIG. 4 is a figure that shows the composition of the IP server W according to this embodiment. The IP server W, as depicted in FIG. 4 contains a system controller part 11, a communications part 12, the aforementioned application DB 13, a user management DB 14, an interface part 15 (hereinafter "interface" is abbreviated as "I/F"), and a controller element 16.

The communications part 12, relays transfer of data to and from system controller part 11 and internet INET, and passes data received from external electronic devices through internet INET to system controller part 11, and transmits data accepted from system controller part 11 to external electronic devices through internet INET.

The system controller part 11 contains a Central Processing Unit (CPU), a Read Only Memory (ROM), a Random Access Memory (RAM), nonvolatile memory, etc., and it controls each component of IP server W. The ROM contains a variety of control information and control programs to control each component of IP server W. The nonvolatile memory stores HTML data for composing various web pages, etc., and also stores the WWW server program and mailer mentioned. The CPU performs operations executed in accordance with various programs stored in ROM and nonvolatile memory. The RAM is being used as a work area that stores data temporarily for the operations of the CPU.

Figures 5, 6:
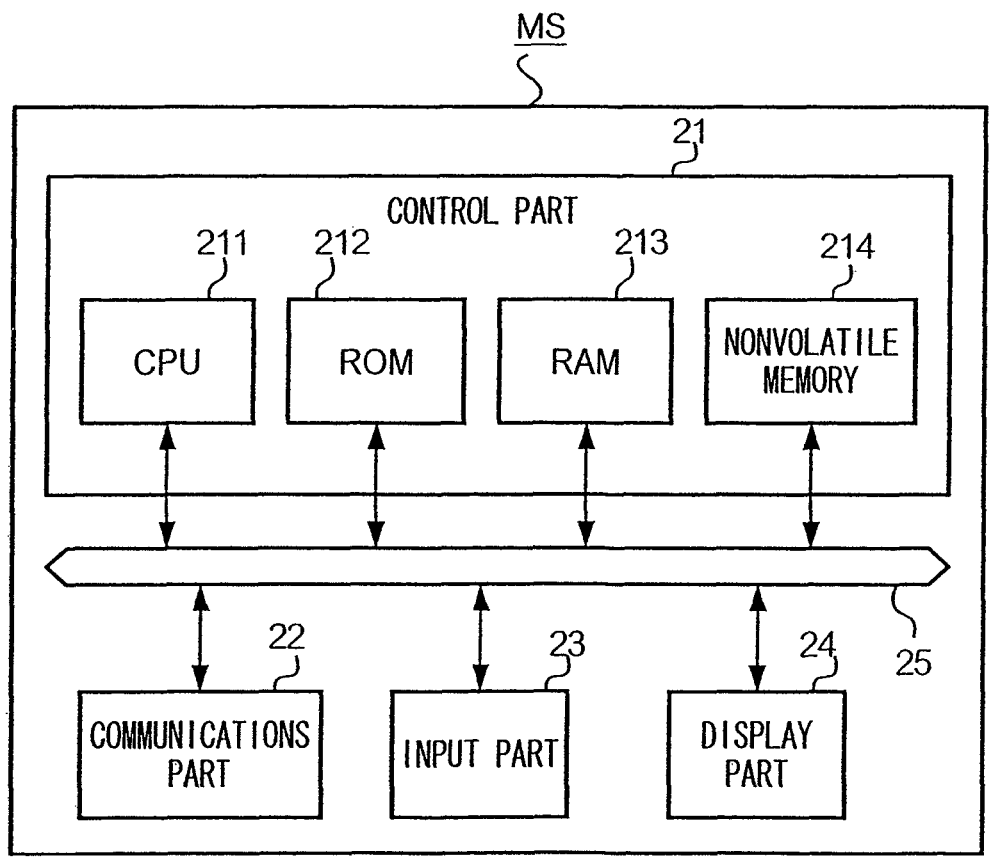
FIG. 5 is a diagram showing contents stored in a user management DB for the first preferred embodiment of the present invention.
FIG. 6 is a block diagram showing a composition of a mobile device for the first preferred embodiment of the present invention.

In user management DB 14, information concerning the mobile device MS that downloaded the Java application from IP server W is stored. FIG. 5 is a figure that illustrates the contents of data stored in user management DB 14. In user management DB 14, first, for each Java application stored in application DB 13, as information to specify each Java application, a URI that indicates the download origin of that Java application's ADF is stored. Moreover, in user management DB 14, the mail addresses of any number of mobile devices MS that downloaded each Java application are stored in correspondence with the URIs of those Java applications.

Interface part 15 shown in FIG. 4 relays the transfer of data between system controller part 11 and controlling element 16. The controlling element 16 is composed of keyboard, mouse, liquid-crystal display, etc., and through controlling element 16, the system controller part 11 acquires data from the user and supplies content to the user. Moreover, the controlling element 16 can be an electronic device such as a PC with input-output functions connected to IP server W.

The manager or the like of IP server W (hereinafter "operator"), by operations used in controlling element 16, performs specification of Java applications that should be started in mobile device MS.

For example, when the operator wants to provide, for a mobile device MS that has already downloaded a Java application, a startup instruction for that Java application, the operator, by operating the keyboard and other user interface control devices of controlling element 16, designates a URI that indicates the download origin of the Java application as the information designating that Java application.

In response to the operation of the operator, the system controller part 11 creates e-mail that includes startup instruction tags that include between them, as the application specifier, the URI that has been designated (see FIG. 3). Then, the system controller part 11 read outs from user management DB 14 the mail addresses of the mobile devices MS that have been put into correspondence with the Java application specified by the designated URI. The system controller part 11 runs the mailer and addresses the e-mail created using all of the mail addresses read out and transmits the e-mail created.

[1.1.3: Composition of the Mobile Device]

FIG. 6 is a figure that shows the composition of a mobile device MS according to this embodiment. The mobile device MS contains a control part 21, a communications part 22, an input part 23, and a display part 24. Each of these components is interconnected by a data bus 25.

The communications part 22 performs radio communications with base stations BS under the control of control part 21. The display part 24 is composed of a liquid crystal panel, a driving force circuit, etc., and, the under control of control part 21, shows various information. The input part 23 has various buttons and, in response to button operations by the user, sends to control part 21 operation signals that correspond to the buttons.

The control part 21 has CPU211, ROM212, RAM213, nonvolatile memory 214, etc., and controls each component of mobile device MS.

The CPU211, by executing applications stored in ROM212 and nonvolatile memory 214, controls each component of mobile device MS. The RAM213 is used as a work area for CPU211 that temporarily stores data for operations.

The ROM212, apart from holding various control information and control programs, also holds various applications to be executed by CPU211. The applications stored in ROM212 have been preinstalled for mobile device MS and are already in ROM212. As applications stored in ROM212, in addition to the WWW browser and mailer mentioned, there is Java 2 Micro Edition (J2ME), etc., as software for creating the execution environment of a Java application. Hereinafter, in the case where there is a need to distinguish an application stored in ROM212 from a Java application that has been downloaded from IP server W, we call an application stored in ROM212 a "native application".

Figure 7:
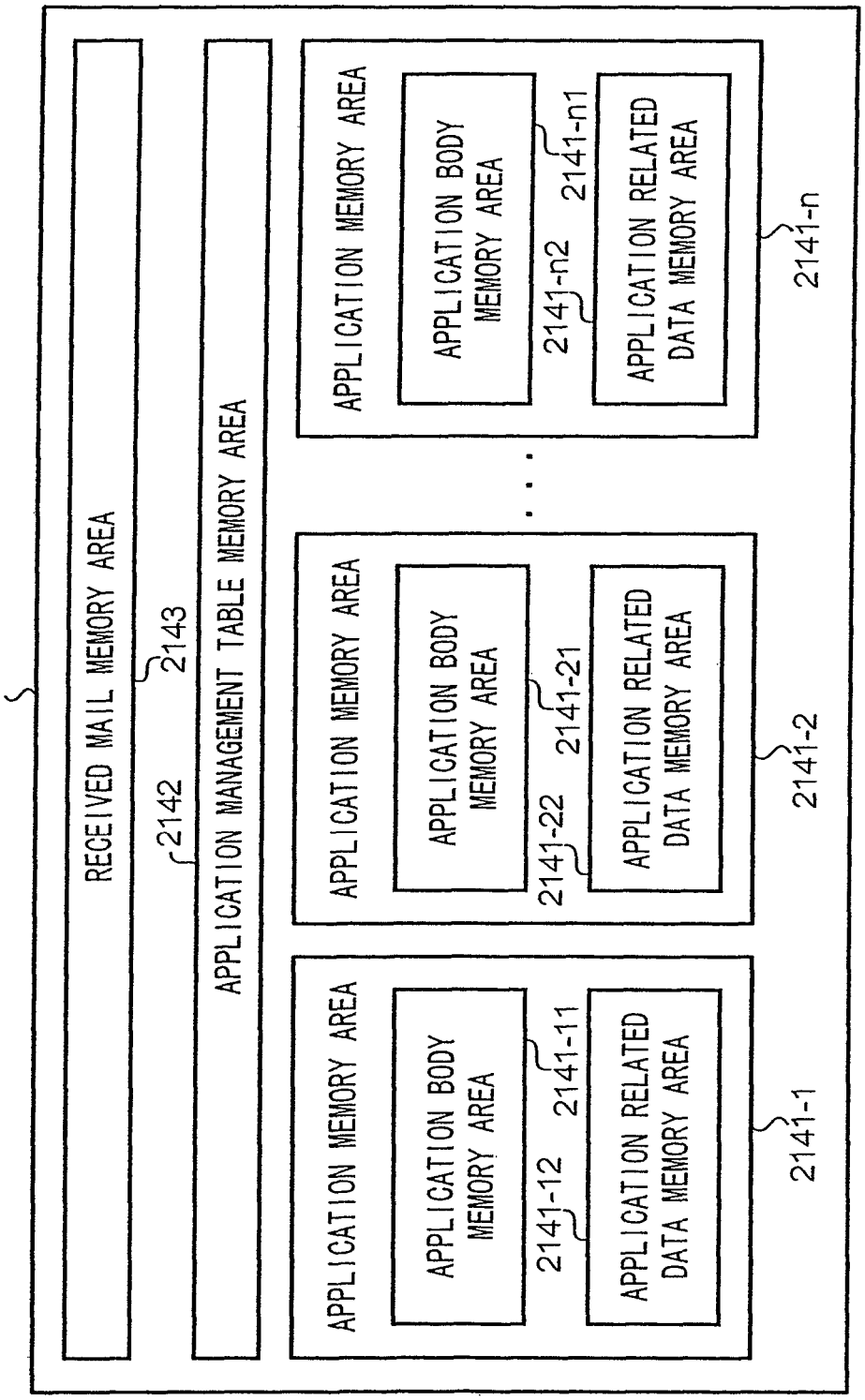
FIG. 7 is a diagram showing contents stored in mobile device's nonvolatile memory for the first preferred embodiment of the present invention.

FIG. 7 is a figure that shows the composition of data that is stored in nonvolatile memory 214. In nonvolatile memory 214, multiple application memory areas 2141-$k$ ($k$=1, 2, ..., n), an application management table memory area 2142 and a received mail memory area 2143 are established. The received mail memory area 2143 is an area for storing e-mail that mobile device MS received. The application memory area 2141-$k$ is an area for storing Java applications that mobile device MS downloaded from IP server W, and data related to those Java applications. Application memory areas 2141-$k$ subsume application body memory areas 2141-$k$1, which are established for storing the respective bodies of Java applications, and application related data memory areas 2141-$k$2, which are established for storing the various respective data that relates to Java applications.

In application body memory areas 2141-$k$1 the ADF, that form the body of a Java application, and the JAR file are stored. As Java applications stored in application body memory areas 2141-$k$1, there may also be applications that implement games for mobile device MS, online stock trading applications, applications that provide weather reports, and applications that keep the user frequently informed of new information by acquiring that information from IP server W.

In application related data memory areas 2141-$k$2, there is data that was downloaded as attachment data from IP server W when the body of a Java application was downloaded; data that the user of mobile device MS entered as settings for Java applications; data acquired as data that relates to Java applications for operations that mobile device MS executed in accordance with other applications; and data created in operations that the mobile device MS executed in accordance with Java applications, and so on. For example, in the case where, in application body memory areas 2141-*k*1, an application for implements a game in mobile device MS is stored, saved data for that game that shows points the user acquired, the intermediate progress of the game, etc., can be stored in the application related data memory areas 2141-*k*2 as related data.

The CPU211 controls by ruining the control program so that, in operations executed in accordance with Java applications stored in application body memory areas 2141-*k* 1, all related data except for related data stored in application related data memory areas 2141-*k*2 that have been included in the same application memory area 2141-*k*, cannot been directly used. For example, the CPU211, in operations executed in accordance with a Java application stored in application body memory area 2141-11, does not directly read out and use data in application related data memory area 2141-22, application related data memory area 2141-32, etc.

Application management table TBL1, which indicates the storage locations of Java applications that mobile device MS downloaded from IP server W, is held in application management table memory area 2142. FIG. 8 is a figure that illustrates the contents of application management table TBL1. In application management table TBL1, the URI that indicates the download origin of the ADF as information that specifies the Java applications that the mobile device MS downloaded from IP server W, and the memory address of application memory area 2141-*k* that is storing Java applications, are put into correspondence and are stored.

Figure 9:
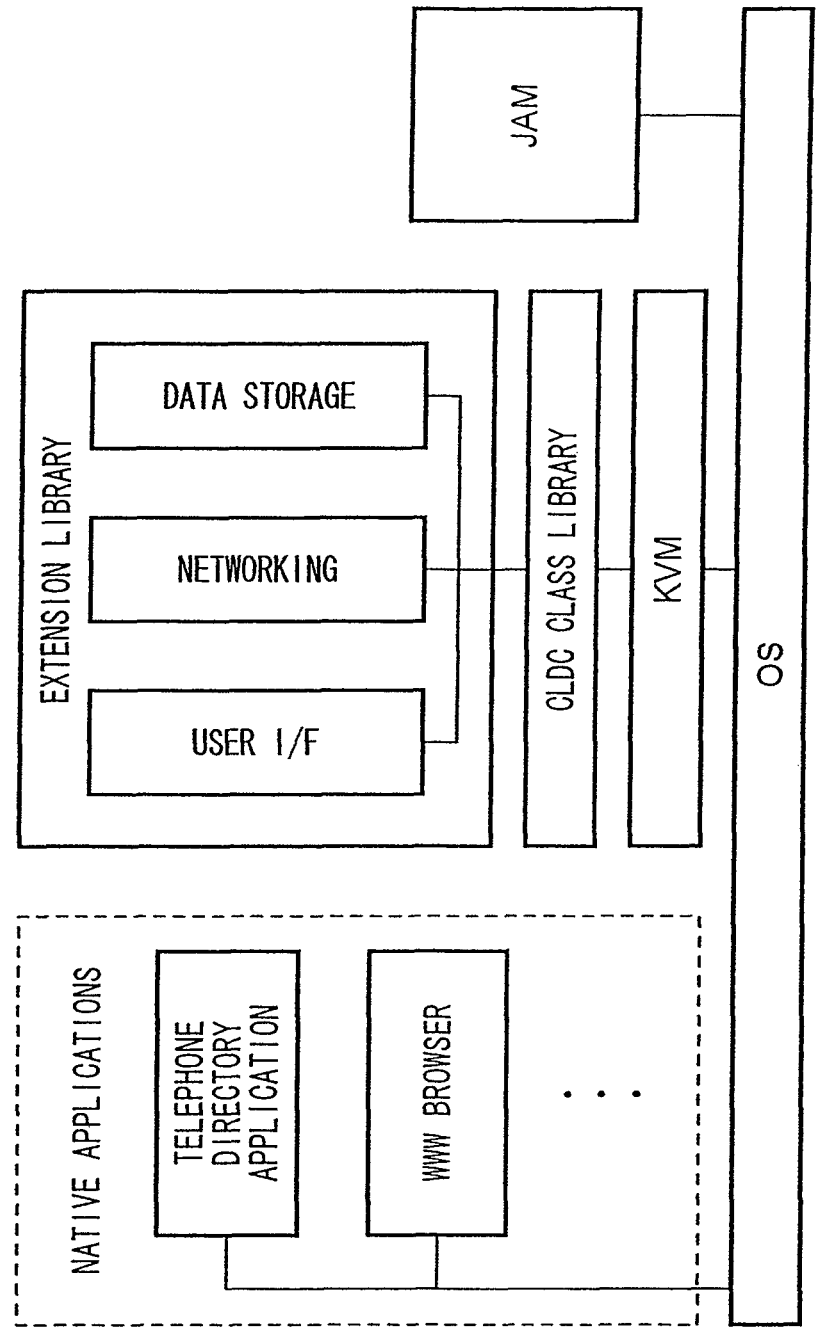
FIG. 9 is a diagram showing Java application's execution environment in a mobile device for the first preferred embodiment of the present invention.

FIG. 9 is a figure that shows the execution environment of Java applications established in mobile device MS. The execution environment of Java applications for mobile device MS includes the Operating System (OS) that controls the fundamental operations such as input-output operations for mobile device MS, and in addition, native applications that execute using functions provided by the OS, the K Virtual Machine (KVM) and Connected Limited Device Configuration (CLDC) class libraries for configuring the J2ME, the extension libraries, and the Java Application Manager (JAM).

KVM is a Java Virtual Machine (JVM) that has been designed for use in small electronic devices. KVM changes bytecodes, that are the code for the executable file format of Java applications, into executable codes, which CPU211 can interpret in accordance with the OS and execute. The CLDC class library is a library of programs with functional restrictions in hand-held telecommunications equipment in consideration of their restricted CPU throughput and memory capacity.

The extension library is a library of programs using the CLDC class library to implement various functions for mobile device MS. In the extension library, there are multiple Application Program Interfaces (APIs) in response various requirements, such as user I/F, networking, data storage, etc. For example, the API for data storage use is a program to implement reading and writing of related data for application related data memory areas 2141-*k*2.

JAM provides, using functions provided by the OS, various management functions for Java applications, such as management of the download of Java applications, management of installation and deletion of Java applications in application memory areas 2141-*k* and the like, and management of startup and forced termination of installed Java applications.

For example, CPU211 runs JAM and compares the transmission origin mail address of the e-mail received with the trusted source data included in the ADF of the Java application designated by the application specifier included in that e-mail, and determines whether to perform the startup operation instructed in the e-mail received.

[1.2: Operations]

Below, the operations of the present invention are explained. The user of mobile device MS, prior to using a Java application, must first download the application from IP server W. After that, mobile device MS, by e-mail that is sent from IP server W, can perform a startup operation for the downloaded Java application.

[1.2.1: Operations when Downloading Java Application]

Figure 10:
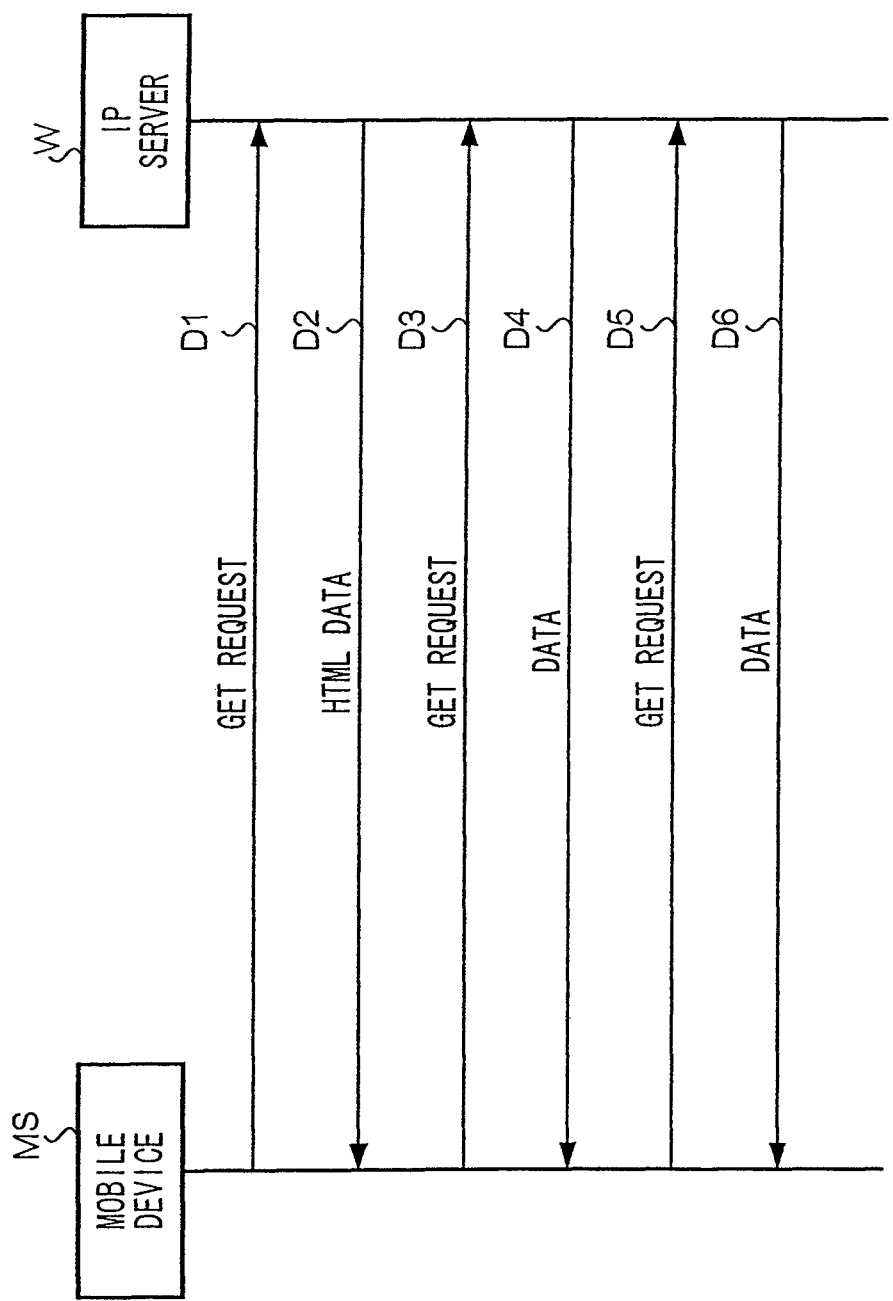
FIG. 10 is a diagram showing flows of data transfers executed in a communication system for the first preferred embodiment of the present invention.

First actions of a user of the mobile device MS when downloading Java applications for mobile device MS from IP server W are explained using the data sequence chart in FIG. 10. Moreover, in the following explanation, contents stored in application DB 13 is assumed to be as shown in FIG. 2, and the mail address of mobile device MS is assumed to be "aa@aa.ne.jp".

The user performs operations using input part 23 to specify startup of the WWW browser for mobile device MS. The CPU211 receives, from input part 23, an operation signal that indicates an instruction to start up the WWW browser and, in response to that operation signal, it reads the WWW browser from ROM212, while at the same time it performs a registration process to a packet service user management unit included in mobile packet communications network MPN for mobile device MS to perform packet communications between mobile packet communications network MPN.

Then, the user inputs to mobile device MS the URI that indicates the storage location of the web page used to download the Java application which is to be stored in IP server W (hereinafter "download page"). The CPU211, in response to input of the URI by the user, sends a GET request D1, which includes that URI and identifier of that mobile device MS, through communications part 22 to mobile packet communications network MPN. On the basis of the URI, the GET request D1 is sequentially sent to the IP server W specified by the URI through gateway server GWS, and internet INET.

When the system controller part 11 of IP server W receives GET request D1 through communications part 12, it runs the WWW server program and sends the HTML data D2 that corresponded to the URI included in GET request D1 (i.e. various data to compose the download page), along with the identifier of mobile device MS included in GET request D1, to internet INET. On the basis of the identifier of the mobile device MS, the HTML data D2 is sequentially sent to the mobile terminal MS specified by the identifier through, gateway server GWS, mobile packet communications network MPN, and base stations BS.

Figure 11:
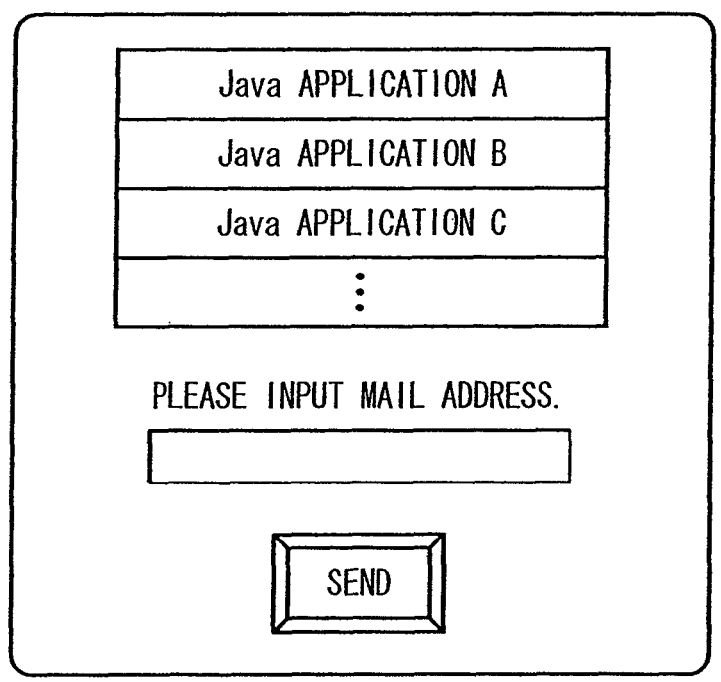
FIG. 11 is a diagram showing a screen shown in mobile device's display for the first preferred embodiment of the present invention.

The CPU211 of mobile device MS receives HTML data D2 and stores HTML data D2 in RAM213; then, after it has composed the download page based on HTML data D2, it displays the download page in display part 24. FIG. 11 is a figure that shows a download page. The download page includes downloadable Java applications from IP server W to mobile device MS (i.e., the name list of all Java applications stored in application DB 13), the input field of the mail address, and a "send" button. Moreover, the names of the Java applications displayed in the download page and the URIs that indicate the download origins of the ADFs of the respective Java applications have been put into correspondence.

The user performs an operation in the download page that selects the names of the Java applications that will be downloaded, and inputs a personal mail address, "aa@aa.ne.jp", in the mail address input field and, after that, performs a choice operation of the "send" button. In response to that choice operation, the CPU211 creates the URIs of the ADFs that have been put into correspondence with the name of the Java applications the user selected, the mail address "aa@aa.ne.jp" the user entered, and a GET request D3 that includes the identifier of mobile device MS, and sends the GET request D3 to mobile packet communications network MPN.

GET request D3 is received by the IP server W specified by the URI. When system controller part 11 of IP server W receives GET request D3, it extracts the mail address "aa@aa.ne.jp" included in GET request D3 and stores the mail address extracted in the row of user management DB 14 specified by the URIs included in GET request D3 (see FIG. 5). Then, the system controller part 11 reads out from application DB 13 the ADFs that corresponded to the URIs included in GET request D3 and sends, as data D4, to internet INET, the ADFs read out, along with the identifier of mobile device MS included in GET request D3.

Figure 12:
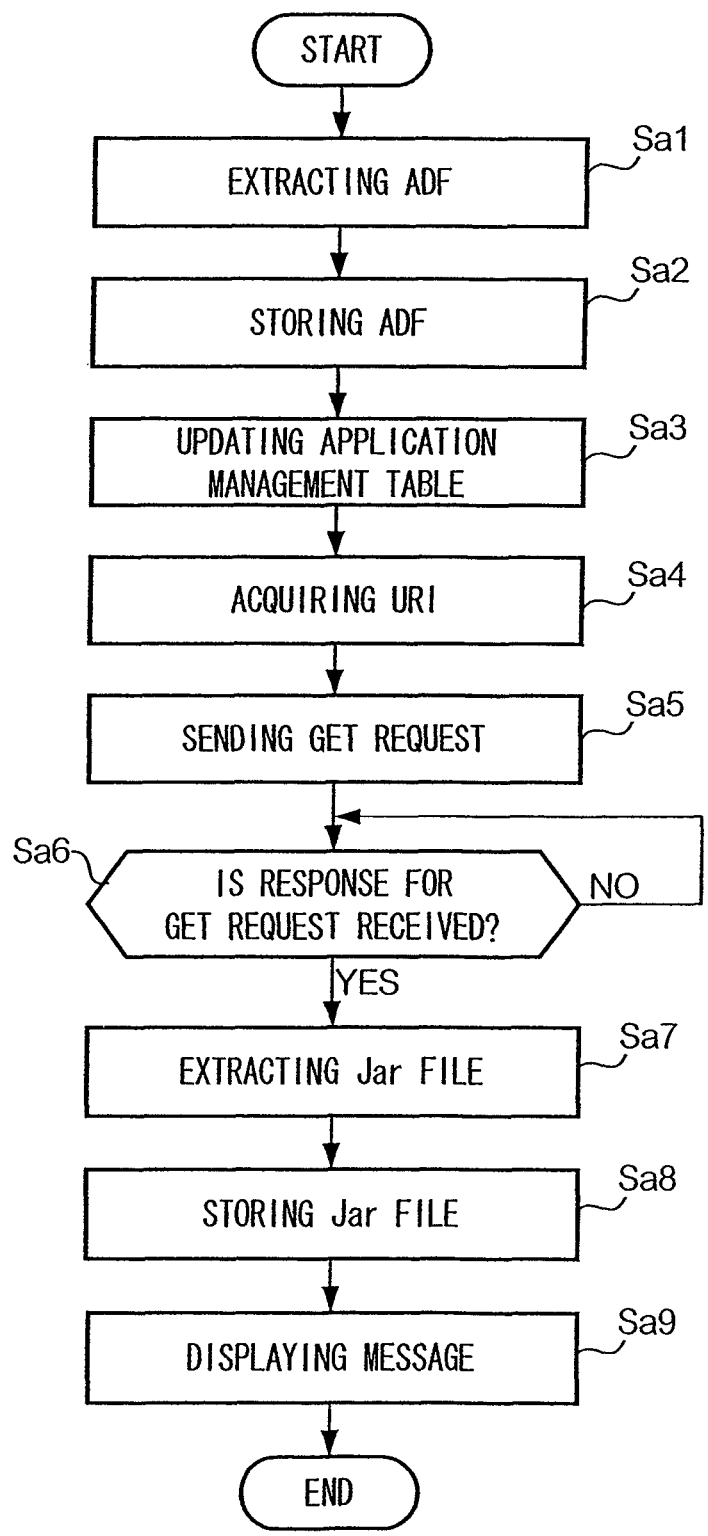
FIG. 12 is a diagram showing operations performed by mobile device's CPU for the first preferred embodiment of the present invention.

Data D4 is received by the mobile device MS that was specified by the identifier. When the CPU211 of mobile device MS receives data D4, JAM performs a download operation on the JAR files that are the substantive data of the Java application. Hereinafter we explain the process using the flow diagram that illustrates, in FIG. 12, the download operation for JAR files.

First, the CPU211 extracts the ADFs from data D4 (step Sa1) and stores the ADFs extracted in an application body memory areas 2141-k 1 (step Sa2). Then, the CPU211 puts into correspondence the memory addresses of application body memory areas 2141-k1 that store the ADFs and the URIs that indicate the download origin of the ADFs; and stores them in application management table TBL1, thereby updating application management table TBL1 (step Sa3).

Then, the CPU211 acquires from the ADFs the URIs indicating the storage locations of the JAR files (step Sa4). Then, the CPU211 runs the WWW browser and sends the URIs acquired, and GET request D5 that includes the identifier of mobile device MS, to mobile packet communications network MPN (step Sa5). After transmission of GET request D5, the CPU211 is put in a state of determining whether it received a response for GET request D5 (step Sa6). That is to say, the CPU211, at short fixed intervals, for example, one second, repeats the operation that determines whether data that includes the JAR files requested using GET request D5 has been received by communications part 22.

On the other hand, based on a URI that indicates the storage location of the JAR files, the GET request D5 sent from mobile device MS is sequentially sent, and is received by IP server W. When the system controller part 11 of the IP server receives GET request D5, it reads out the JAR files that correspond to the URIs included in GET request D5 from application DB 13. The system controller part 11 sends to internet INET the JAR files that were read out, along with the identifier of mobile device MS that was included in GET request D5, as data D6.

The data D6 is received by mobile device MS specified by the identifier. When the CPU211 of mobile device MS receives data D6, it gets "Yes" as a result of the decision of step Sa6. The CPU211 then extracts the JAR files from data D6 (step Sa7). The CPU211, after the JAR files are extracted, stores them in application body memory areas 2141-k1 (step Sa8), displays a message like "download finished" in display part 24 (step Sa9), completing the download operation of a series of JAR files.

Done in the above way, when a Java application is downloaded to mobile device MS, the CPU211 runs JAM, executes an installation operation on the Java applications downloaded, and the CPU211 becomes capable of performing various operations executed in accordance with the Java applications.

[1.2.2: Actions when Starting a Java Application]

For mobile device MS, the actions when it acquires a startup instruction for Java applications downloaded from IP server W from IP server W will be explained. In the following explanation, assume that the memory contents of application DB 13 and user management DB 14 of IP server W respectively are those of FIG. 2 and FIG. 5, and the contents of application management table TBL1 of mobile device MS as being those of FIG. 8. As well, the mail address of IP server W is assumed to be "pp@pp.ne.jp".

The operator of IP server W, by operating controlling element 16, displays a list of Java applications stored in application DB 13. The operator performs an operation that selects, as a Java application he or she wishes to start on mobile device MS, "Java application A", for example, in that list display screen. The system controller part 11 of IP server W, in response to that operation, executes an e-mail transmission operation explained below.

First, the system controller part 11 reads out from user management DB 14 all mail addresses stored in correspondence with the URI that indicates the download origin of the ADF of "Java application A" (i.e. "aa@aa.ne.jp", "bb@bb.ne.jp", etc.), and temporarily records them in RAM.

Then, the system controller part 11 reads out from user management DB 14 the URI that indicates the download origin of the ADF of "Java application A", "http://www.??.co.jp/$$a", and temporarily records it in RAM.

Then, the system controller part 11 creates e-mail with startup instruction tags that include between them the URI "http://www.??.co.jp//$$a" stored temporarily in that RAM as application specifier; i.e., it creates e-mail with tags that include "<MOVE><param>" http://WWW.??.co.jp/$$a "</param></MOVE>".

As a result, the e-mail as shown in FIG. 3 is created.

Then, the system controller part 11 runs the mailer and addresses all e-mail created, using the mail addresses temporarily stored previously in RAM (i.e. "aa@aa.ne.jp", "bb@bb.ne.jp", etc.) and sends the e-mail messages created.

The e-mail transmitted from IP server W is push-distributed from gateway server GWS to mobile device MS.

The CPU211 of mobile device MS receives the e-mail sent from IP server W and executes a series of operations that include startup operations for the Java application.

Hereinafter, using FIG. 13, this operation is explained.

Moreover, in the following explanation, the actual operations CPU211 performs in accordance with "mailer", "JAM" or "Java application A" will be conveniently expressed as 'operations performed by "mailer", "JAM" or "Java application A"' and the like. For example, in the case where "JAM reads outs the memory address" is written below, for all practical purposes that wording signifies "the CPU211 reads out the memory address in accordance with JAM."

First, the mailer, determines whether a startup instruction tag is included in the e-mail received (step Sb1). In the case where the result of the decision of step Sb1 was "No", the mailer stores the received e-mail in e-mail memory area 2143 (step Sb2) and returns to the regular routine of mobile device MS.

On the other hand, in the case where the result of the decision of step Sb1 was "Yes", the mailer extracts from e-mail the application specifier described between startup instruction tags, i.e. the URI "http://WWW.??.co.jp/$$a" of the ADF for Java application A, and the transmission origin mail address "pp@pp.ne.jp" of the e-mail, and delivers those to JAM (step Sb3). When JAM receives the URI of the ADF and the transmission origin mail address, it temporarily stores those to RAM213.

Then, JAM, finds the row in application management table TBL1 specified by the URI "http://WWW.??.co.jp/$$a" of the ADF temporarily stored to RAM213 (step Sb4). JAM reads out memory address "#0001" stored in the row found and temporarily stores the memory address read out to RAM213 (step Sb5).

Then, JAM extracts the ADF from application body memory areas 2141-k 1 specified by the memory address "#0001" read out, and temporarily stores it in RAM213 (step Sb6). JAM extracts a trusted source data from the ADF read out (step Sb7). JAM determines whether there is, inside the mail address included in the trusted source data extracted, a part that coincides with the transmission origin mail address "pp@pp.ne.jp" temporarily stored in RAM213 previously (step Sb8). This decision is a decision to confirm whether the startup instruction for Java application A included in the e-mail is something that was sent from a transmission origin that has been determined to be trusted by the manager or the like of IP server W, the supplier origin of Java application A.

Moreover, when comparing a mail address included in trusted source data with the transmission origin mail address of the e-mail, it may compare with a section of the mail address instead of comparing the entirety. For example, when comparing only a part of a domain name like "@pp.ne.jp", it is not an individual mail address, but rather the group entirety of mail addresses transmitted through a specific server, that is regarded as being e-mail that has been transmitted from a trusted transmission origin.

In the case where the result of the decision of step Sb8 was "No", without performing startup for Java application A according to the startup instruction tags in the e-mail, JAM returns to the regular routine of mobile device MS.

On the other hand, in the case where the result of the decision of step Sb8 was "Yes", JAM displays a message screen such as "Start Java Application A?" (step Sb9). This message screen includes a "Yes" button and a "No" button. When the user performs an operation for that message screen that selects any button, JAM decides whether it was the "Yes" button that was selected (step Sb10). In the case where the user performed a button selection operation "No", JAM gets "No" as the result of step Sb10. In that case, JAM returns to the regular routine of mobile device MS In the case where the user performed an operation selection of "Yes", JAM gets "Yes" as the result of step Sb10. In that case JAM reads the stored JAR file from application body memory area 2141-k1 specified by memory address "#0001" temporarily stored in RAM213, runs the Jar file read out and starts Java application A (step Sb11). The above is the startup operation for a Java application.

With the above operations, a mobile device MS can, in accordance with startup instruction tags in sent e-mail, start a Java application. Accordingly, the manager or the like of IP server W, only by sending e-mail to mobile device MS, can perform an instruction of startup for a Java application stored in mobile device MS.

For example, the manager of IP server W or the like can start in mobile device MS a Java application that displays weather reports and stock trade information by sending e-mail. In the case where these Java applications, prior to starting, have settings from the user that automatically display the acquisition of information from defined sites on the Internet, the user, as a result of receiving e-mail that has been push-distributed from IP server W, can receive notices of important changes in the weather or stock prices in a timely manner, without performing troublesome operations.

Moreover, by operations on mobile device MS by the user, it is permissible to suppress the above step Sb9 confirmation of all Java applications or any specific Java application. This being the case, there is no longer any need for the user to perform confirmation operations while receiving e-mail from IP server W that includes startup instruction tags.

In a mobile device according to this embodiment, when getting the above results, it is decided based on trusted source data in Java application ADF and the address of the e-mail sender origin, whether it may perform operations acting on startup tags included in the e-mail; only in the case where it has been confirmed that the source of the e-mail is trusted by that decision, is the mobile device considered a composition that executes startup operations that acted on startup tags. Accordingly, information security is assured for mobile device MS by not starting Java applications stored in mobile device MS by startup tags that are included in e-mail created by untrusted third parties.

As well, a mobile device according to this embodiment, before performing startup of a Java application, has become a composition that gets the consent of the user. Accordingly, the user will not unintentionally perform startup of Java applications.

As well, e-mail received by a mobile device according to this embodiment can include startup instruction tags specified by the operator of IP server W that can include any Java application URI. Accordingly, due to the inclusion of the URI of the desired Java application in e-mail, the operator can direct the startup of any Java application downloaded to mobile device MS.

As well, when the operator of IP server W produces e-mail that includes startup instruction tags, then, based on the URI of the Java application identified by the startup instruction tags, the mail address of the mobile device MS that downloaded that Java application is acquired automatically from user management DB 14 and is established as the address of the e-mail. For that reason the operator, by not having been designated the addresses of e-mail, can transmit e-mail for multiple mobile devices MS.

Moreover, this embodiment uses "<MOVE>" "</MOVE>" and "<IMPORT>" "</IMPORT>" character strings as startup instruction tags; however, it is permissible to use other character strings. As well, this embodiment employs application specifiers using as parameter tags "<param>" "</param>" between startup instruction tags; however, the method of specification of this information is not restricted to methods that use parameter tags.

As well, in this embodiment, the user management DB 14, concerns each Java application that has been stored in IP server W, has stored in it the mail addresses of all mobile devices MS that downloaded the Java application, and has become a composition that can include, as e-mail recipients, the mail addresses of all of the mobile devices that downloaded the Java applications designated by the operator.

However, among the mobile devices MS that downloaded the Java application, it may designate as recipients of the e-mail only a portion of the mail addresses of mobile devices MS. For example, IP server W can have a web page that accepts e-mail distribution applications and, it may transmit e-mail only for mobile devices MS which are indicated in the distribution accepted in that web page. In that case, user management DB 14 may only stores the mail addresses of mobile devices MS for which an application for distribution has been made.

Moreover, in this embodiment the gateway server GWS is constructed so as to push-distribute e-mail for mobile devices MS; however the form of e-mail distribution for mobile devices MS from gateway server GWS is not restricted to push distribution. For example, when a gateway server GWS has received e-mail that was addressed to a mobile device MS, it sends an arrival notice to mobile device MS and, only in the case where mobile device MS that received that arrival notice performs an e-mail send request to gateway server GWS, the gateway server GWS may send to mobile device MS e-mail that was addressed to mobile device MS.

2: Second Preferred Embodiment

In the above first preferred embodiment, Java applications for mobile device MS are started by sending e-mail for mobile device MS that includes startup instruction tags. Regarding the communication system according to second preferred embodiment, by receiving HTML data that corresponds to web pages stored in IP server W, mobile device MS acquires a startup instruction for Java applications stored in mobile device MS from IP server W.

[2.1: Composition]

According to this embodiment, the composition of the whole system, including the composition of the IP server, and the composition of the mobile device, is very similar to that of the first preferred embodiment. Accordingly, hereinafter, discussion regarding this embodiment concerns only the differences with the first embodiment. In particular, symbols used in the first embodiment will be the same as those used in this embodiment.

First, the nonvolatile memory that the IP server W according to this embodiment contains in its system controller part 11, stores various HTML data corresponding to a web page (hereinafter "startup instruction page") that is used for IP server W to instruct mobile device MS to start a Java application.

FIG. 14 is a figure that illustrates the contents of the HTML data corresponding to a startup instruction page. In HTML data, various tags are included that show all the elements that compose the page, i.e. the construction of "<HEAD>" and "</HEAD>" for the HEAD tag, the construction of "<TITLE>" and "</TITLE>" for the TITLE tag and so on. For example, the data included between the HEAD tags is data that shows the contents of the header part of the web page. In HTML data corresponding to the startup instruction page of this embodiment, in addition to various tags generally used such as the HEAD tag, a tag with a format like "<MOVE"http://??.co.jp/$$a> . . . </MOVE>" is included. Hereafter, a tag of this form is called the MOVE tag. The MOVE tag is a tag that also holds information for the startup instruction tag of the first preferred embodiment.

With the MOVE tag, the "http://??.co.jp/$$a" following "<MOVE" is indicating, as specification information of a Java application, the URI of the Java application. I.e., this information is identical to the application specifier of the first preferred embodiment and, in this embodiment as well we call this information the application specifier.

Instead of providing a startup instruction for a Java application from IP server W to mobile device MS by e-mail as in the first preferred embodiment, in this embodiment, a startup instruction is provided by HTML data that corresponds to a startup instruction page.

Accordingly, an IP server W according to this embodiment does not need to contain a mailer and user management DB 14. However, an IP server W in this embodiment may also have the function of startup instruction by e-mail as in the first preferred embodiment.

As well, a mobile device MS according to this embodiment, instead of the function that performs application startup using application specifiers included in e-mail received by the mailer, contains a function to perform startup of applications using application specifiers included in a startup instruction page acquired by the WWW browser.

The ADF of the Java application according to this embodiment includes, as in the first preferred embodiment, a trusted source data. However, in the trusted source data according to this embodiment, as data that indicates the source of a startup instruction previously trusted by the manager or the like of IP server W, instead of the transmission origin mail address of the e-mail in the first preferred embodiment, the URI of the download origin of the HTML data is included.

[2.2: Operations]

Hereinafter the operations of this embodiment are explained using as an example a case where a mobile device MS starts a Java application that displays a product catalogue, acting on startup instruction tags included in startup instruction pages that have been sent to mobile device MS by IP server W. As well, the URI of the startup instruction page is assumed to be "http://WWW.pp.co.jp/dd.html".

First, the user, by operating input part 23 of mobile device MS, inputs the URI "http://WWW.pp.co.jp/dd.html" for HTML data that corresponds to the startup instruction page of IP server W. In response to that input operation, the CPU211 of mobile device MS executes the WWW browser and sends to mobile packet communications network MPN the entered URI "http://WWW.pp.co.jp/dd.html" and a GET request that includes the specifier of mobile device MS.

The GET request sent from mobile device MS is received by IP server W through gateway server GWS and internet INET on the basis of the URI "http://WWW.pp.co.jp/dd.html". When the system controller part 11 of IP server W receives the GET request, it executes the WWW server program and sends the specifier of mobile device MS together with the HTML data corresponding to startup instruction page in the GET request to internet INET. The HTML data sent from IP server W, based on the specifier of mobile device MS, is received by mobile device MS through gateway server GWS and mobile packet communications network MPN. When CPU211 of mobile device MS receives the HTML data, it executes the WWW browser and, based on the HTML data received, composes a web page and, displays the web page composed, i.e. the startup instruction page, in display part 24.

FIG. 15 is a figure that shows a startup instruction page that is displayed in display part 24 of mobile device MS. In the startup instruction page, for example, there is a message like "Select the catalog you'd like to see" and buttons respectively corresponding to Java applications that will display catalogs like "Catalogue A," "Catalogue B", etc. For example, "Catalogue A" is a button that corresponds to a Java application A that will display Catalog A. Similarly, buttons "Catalogue B", "Catalogue C" . . . correspond to Java applications B, C . . . . The buttons respectively corresponding to these Java applications are put into correspondence with MOVE tags. In the MOVE tag is included, as application specifier, the URI of the ADF of the Java application that corresponds to the button.

Figure 16:
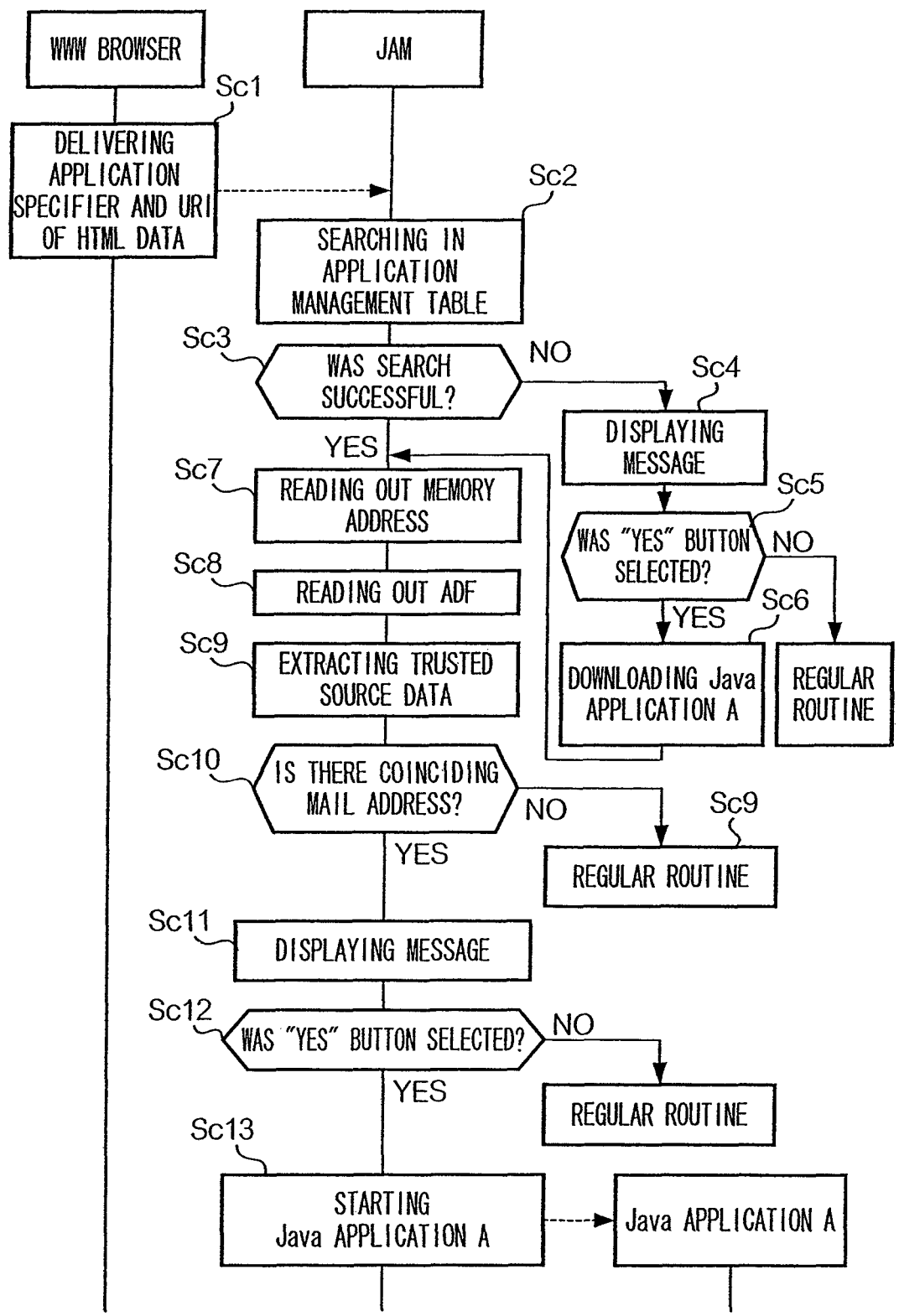
FIG. 16 is a diagram showing operations performed by mobile device's CPU for the second preferred embodiment of the present invention.

With the startup instruction page, in the situation shown in display part 24, the user selects, for example, the "Catalogue A" button by operating input part 23. In response to that choice operation, the CPU211 executes a series of operations that include a Java application startup operation. Hereinafter, using FIG. 16, these operations are explained.

Moreover, in the following explanation, when it is described that "the WWW browser", "JAM" or "Java application A" performs operations, it should be understood as a convenient way for describing that CPU211 performs those operations in accordance with "the WWW browser", "JAM" or "Java application A".

First, the WWW browser delivers to JAM the application specifier "http://WWW.??.co.jp/$$a" included in the MOVE tag corresponding to the "Catalogue A" button selected by the user and the URI "http://WWW.pp.co.jp/dd.html" of HTML data corresponding to the startup instruction page (step Sc1).

When JAM receives the application specifier and the URI of HTML data from WWW browser, it temporarily stores those in RAM 213. JAM then searches, in application management table TBL1, the row indicated by the application specifier "http://WWW.??.co.jp/$$a" received (step Sc2). Then, JAM determines whether it succeeded in the search of step Sc2 (step Sc3).

In the case where the application specifier "http://WWW.??.co.jp/$$a" is not included in any row of application management table TBL1, JAM failed in the search of step Sc2, and JAM gets "No" as the decision result of step Sc3. In that case, it displays a message screen such as "Download the Java application corresponding to the selected button?" (step Sc4). This message screen includes a "Yes" button and a "No" button. When the user performs selection of any button in this message screen, JAM performs a decision of whether the "Yes" button has been selected. In the case where the user performed a selection operation of the "No" button, JAM gets "No" as the decision result of step Sc5. In that case, JAM returns to the regular routine of mobile device MS.

On the other hand, in the case where the user performed a selection operation of the "Yes" button, JAM creates a GET request that includes an application specifier accepted from the WWW browser in step Sc1, in other words, the URI of Java application A, and sends it to mobile packet network MPN. That GET request resembles the GET request D3 (FIG. 10) of the first embodiment.

The GET request that is sent to mobile packet communications network MPN from mobile device MS is received by IP serve W and, after that, between IP server W and mobile device MS, data D4, GET request D5 and data D6 of the first preferred embodiment are relayed. With that result, Java application A is downloaded to mobile device MS (step Sc6). Detailed explanation of these operations are omitted, because they are identical to the operations of steps Sa1 through Sa9 explained using FIG. 12 in the first preferred embodiment.

In the case where the decision result of step Sc3 was "Yes", in other words, in the case where Java application A is already downloaded to mobile device MS, and in the case where the download of Java application A in step Sc6 was completed, Jam performs the following series of operations.

Step Sc7: read out memory address from row in application management table found or from row that corresponds to the newly downloaded Java application.

Step Sc8: read out ADF of Java application A corresponding to memory address read out.

Step Sc9: extracts trusted source data included in ADF read.

Step Sc10: decision of whether a URI that coincides with the URI of the HTML data is included in trusted source data extracted.

Step Sc11: display of message of confirmation of startup for user.

Step Sc12: decision of whether "Yes" button has been selected by user.

Step Sc13: startup of Java application A.

The operations of the above steps Sc7 through Sc13 correspond to steps Sb5 through Sb11 respectively (see FIG. 13) of the first preferred embodiment. However, in the first preferred embodiment, it is determined, in operation of step Sb8, whether the transmission origin mail address of the e-mail is included in the trusted source data, whereas in this embodiment, it is determined, in the operation of step Sc10, whether the URI of the HTML data is included in the trusted source data. As for the rest, because the operations of steps Sc7 through Sc13 in this embodiment are the same as steps Sb5 through Sb11 in the first preferred embodiment, further explanation is omitted.

In step Sc13, when JAM starts Java application A, mobile device MS displays the contents of Catalogue A in display part 24 in accordance with Java application A. Moreover, in the case where mobile device MS has a digital-to-analog (D/A) converter, amplifier and speaker and the like in addition the composition parts shown in FIG. 6, mobile device MS can, in accordance with Java application A, play back sound data, moving picture data including sound data or the like.

By performing the above, a mobile device MS according to this embodiment is capable of performing a startup operation for a Java application based on an application specifier included in the HTML data received by the WWW browser. Accordingly, the manager or the like of IP server W, simply by previously storing in IP server W the HTML data of an application startup page that includes the URIs of such multiple Java applications that mutually relate, becomes capable of instructing a mobile device MS to start the Java applications. Moreover, according to a communication system of this embodiment, the manager or the like of IP server W becomes capable of instructing a mobile device MS to display images and replay sounds simultaneously, where the images and the sounds mutually relate and they are need to be displayed or replayed by respective distinct Java applications.

According to this embodiment, as well as the mobile device MS gets the above kind of effect, it determines, based on the trusted source data in the ADF of the Java application and on the URI that indicates the transmission origin of the HTML data, whether it may perform an operation according to the MOVE tag included in the HTML data of the startup instruction page; and, by that decision, only in the case where it has been confirmed that the source of the HTML data is something trusted, it executes the startup operation according to the MOVE tag. Accordingly, by not having started a Java application stored in mobile device MS using a MOVE tag included in HTML data produced by an untrusted third party, information security in mobile device MS is guaranteed.

Moreover, this embodiment uses "<IMPORT"">" "</IMPORT>" character strings as tags to designate the application specifier however, it is permissible to use other character strings instead. As well, the specified format for application specifiers included between tags is not restricted to what has been mentioned; any format of the same capability may be used.

3: Third Preferred Embodiment

In the above first preferred embodiment, IP server W provides startup instructions for Java applications stored in mobile device MS by sending e-mail for mobile device MS that includes startup instruction tags. Regarding the communication system according to third preferred embodiment, in mobile device MS that has downloaded plural Java applications from IP server W, following a startup instruction included in related data of one Java application, another Java application is started.

In this embodiment, a Java application stored in application DB 13 of IP server W and downloaded from IP server W to mobile device MS is designed so that, when it is executed in mobile device MS, creates startup instructions for other Java applications. For example, Java application A, Java application B, Java application C . . . that are programs for instructing mobile device MS to implement a series of respective game sessions may be an example of such Java applications. In this case, for example, at the end of a session of a game established by Java application A, Java application A creates a startup instruction that specifies the startup of Java application B that corresponds to a session following the session that is ending. In response to the startup instruction, Java application B starts up, and the user of mobile device MS, without having to perform any operation to switch Java applications, can enjoy the game by playing the series implemented by Java application A, Java application B, and so on.

[3.1: Construction]

According to this embodiment, the composition of the whole system, including the composition of the IP server, and the composition of the mobile device, is very similar to that of the first preferred embodiment. Accordingly, hereinafter, the discussion regarding this embodiment concerns only the differences with the first embodiment. In particular, symbols used in the first embodiment will be used for the same as those in this embodiment.

Moreover, in this embodiment, instead of startup instructions for a Java application being provided from IP server W to mobile device MS by e-mail, following startup instructions created by a Java application, another Java application start.

Accordingly, the IP server according to this embodiment does not require a mailer or a user management DB14. However, the IP server W of this embodiment may also include means for providing startup instructions by e-mail as in the first embodiment. Moreover, it may also provide the startup instructions in HTML data as in the second embodiment.

As well, a mobile device MS according to this embodiment contains, instead of a function to perform startup operations for Java applications using application specifiers included in e-mail received by a mailer, a function to start one Java application following startup instructions created by operations executed in accordance with other Java applications.

For example, it is provided that mobile device MS establishes the first session of a game in accordance with Java application A, and at the completion of the first session, it creates a startup instruction for instructing a startup of Java application B that corresponds to the second session. Then, mobile device MS start Java application B following the startup instruction created.

However, because the Java application is something downloaded through an open network like internet INET, it will not necessarily behave correctly. Accordingly, when mobile device MS is unrestrictedly permitted to start a Java application following startup instructions created by other Java applications, there is the possibility of producing an inconvenience such as a wrong Java application for sending private information to external devices may be started without the user's intent instead of a correct Java application.

To avoid the above inconvenience, the ADF of a Java application according to this embodiment includes, as with the first preferred embodiment, a trusted source data. However, in a trusted source data according to this embodiment, as data that indicates the source of the Java application trusted beforehand by the manager of IP server W, instead of the transmission origin mail address of an e-mail as in the first preferred embodiment, the URI of the download origin of the Java application is included.

That is to say, the trusted source data in the first preferred embodiment include as the contents the transmission origin mail address of the e-mail indicating the source of that data that is the application specifier, and on the other hand, the trusted source data in this embodiment includes not data that indicates the source of data, but data that indicates the source of the application that creates the data.

Accordingly, the CPU211 of mobile device MS acting on an application specifier that specifies another application, say Java application B, the application specifier having been created by operations of a Java application, say Java application A, determines whether to start Java application B based on the URI of the download origin of Java application A and its trusted source data.

[3.2: Operations]

Hereinafter are explained the operations of this embodiment. Before the user of mobile device MS can use a Java application, first it is necessary to download that Java application from IP server W. In downloading of a Java application in this embodiment, when mobile device MS transmits to IP server W the specifier of the Java application that the user of mobile device MS wishes to download, there is no need to transmit the mail address of mobile device MS. As well, IP server W does not need to store in user management DB 14 the mail address of the mobile device MS that downloads the Java application. As for the other operations that concern downloading in this embodiment, because they are the same as in the first preferred embodiment, explanation is omitted.

Moreover, in the following explanation, the body of Java application A and related data are assumed to be already stored in application memory area 2141-1 of mobile device MS, and Java application A is assumed to be the application for establishing the first session of a game as mentioned above. As well, it is assumed that the body of Java application B and related data are already stored in application memory area 2141-2 of mobile device MS, and that Java application B is assumed to be the application for establishing the second session of a game as mentioned above. Moreover, the URIs of the download origins of Java application A and Java application B are assumed to be, respectively, "http://WWW.??.ne.jp/$$a" and "http://WWW.??.ne.jp/%%a" and, it is assumed that, in application management table memory area 2142, there is stored the application management table TBL1, with contents as shown in FIG. 8.

First, the user, by operating input part 23 of mobile device MS, performs a startup instruction for Java application A. In response to that input operation, CPU211 reads out from application body memory area 2141-11 a Jar file that has been stored, and starts Java application A on the basis of the Jar file read out.

After that, the CPU 211, due to sequentially displaying in display part 24 images and the like that prompt the user for various input operations and replaying sounds, provides the first session of the game to the user. The user responds to these images and the like with various operations using input part 23, and, when the contents included in session one by mobile device MS have been completely provided to the user, the CPU 211, for example, reads out the ADF of Java application A from application related data memory area 2141-11, in accordance with Java application A.

The ADF of Java application A includes the URI of Java application B corresponding to the second session. CPU 211 reads out the URI of Java application B from the ADF of Java application A. When CPU 211 reads out the URI of Java application B, the CPU 211 searches in application management table TBL1 the row specified by the URI of Java application B. CPU 211 reads out from the searched row the memory address "#0002" indicating application memory area 2141-2 that stores Java application B. CPU 211 creates a startup instruction that includes the memory address "#0002" read out.

Figure 17:
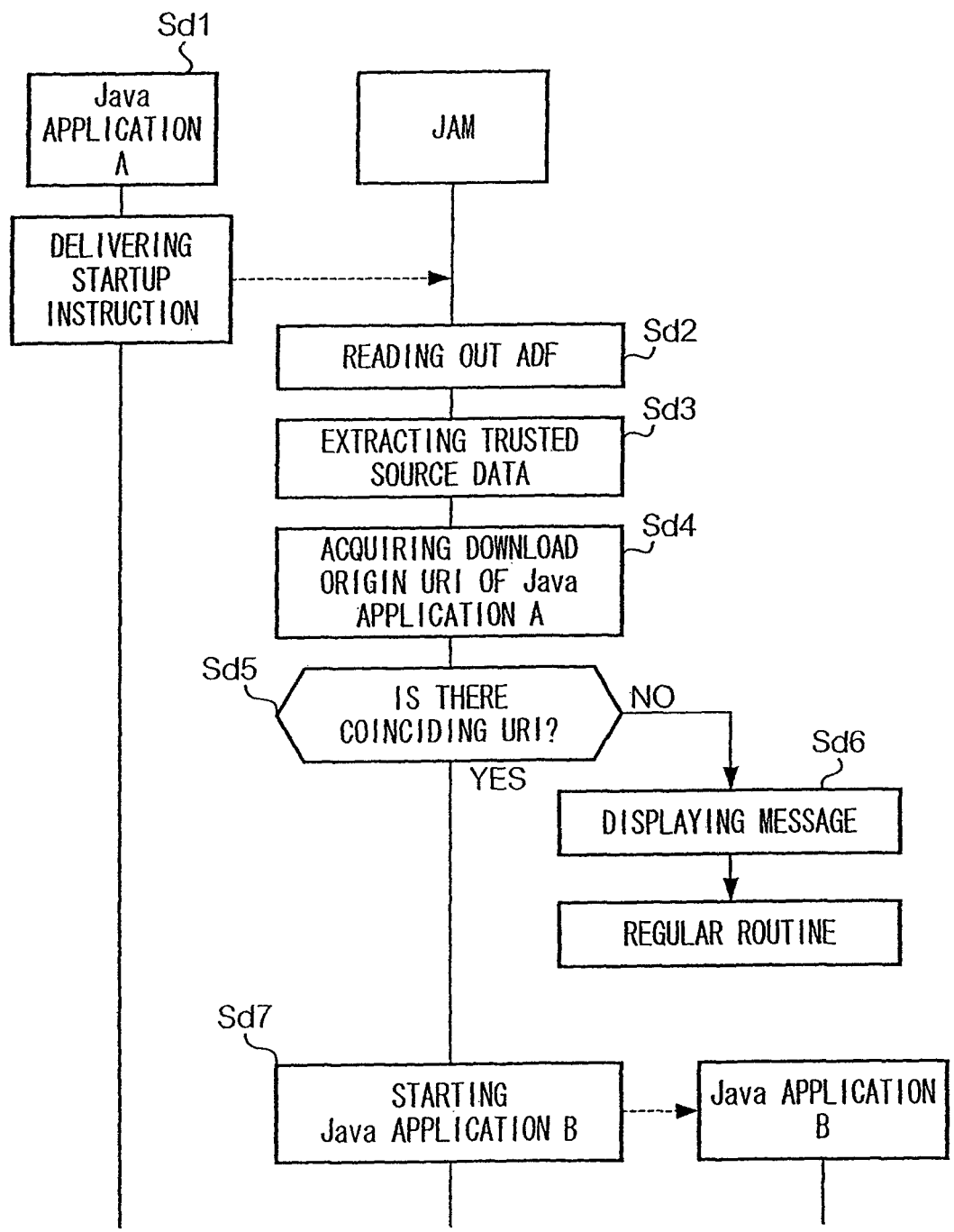
FIG. 17 is a diagram showing operations performed by mobile device's CPU for the third preferred embodiment of the present invention.

Then, CPU 211 executes the startup operation for Java application B. Below, using FIG. 17, this operation is explained.

Moreover, in the following explanation, when it is described that "Java Application A", "JAM" or "Java application B" performs operations, it should be understood as a convenient way for describing that CPU211 performs those operations in accordance with "Java Application A", "JAM" or "Java application A".

First, Java application A delivers to JAM a startup instruction that includes the memory address "#0002" of Java application B that has been created as explained above (step Sd1).

When JAM receives a startup instruction that includes memory address "#0002", it stores memory address "#0002" temporarily in RAM213. Then, JAM, from the application body memory area 2141-21 that is specified by the memory address "#0002" accepted, reads out the ADF of Java application B and stores it temporarily in RAM213 (step Sd2). Then, JAM extracts the trusted source data from the ADF read out and temporarily stores the trusted source data extracted in RAM213 (step Sd3).

Then, JAM looks in application management table TBL1, acquires the download origin URI "http://WWW.??.co.jp/$$a" of Java application A that executed the delivery of the startup instruction to JAM, and temporarily stores the URI acquired in RAM213 (step Sd4). JAM determines whether something that coincides with the URI "http://WWW.??.co.jp/$$a" of the download origin of Java application A acquired in step Sd4 is included in the trusted source data stored temporarily in RAM213 in step Sd3 (step Sd5). This decision is a decision to confirm whether Java application A, which executed the startup instruction of Java application B, is something that has been downloaded from a distribution origin that has been determined to be a distribution origin trusted by the manager or the like of IP server W, the supply origin of Java application B.

Moreover, when comparing the URI included in the rusted source data with the URI of Java application A, it is permissible to compare with a section of the URI instead of comparing the URI entirety. For example, if doing it so as to compare only part of the domain name like "@pp.ne.jp", it is not the URI that corresponded to an individual Java application but rather, it is the group entirety of Java applications downloaded from a specific server, that are regarded as Java applications downloaded from a trusted distribution origin.

In the case where the result of the decision of step Sd5 was "No", it displays a message screen such as "Because can't guarantee security, can't start the second session" in display part 24 (step Sd6); afterward, JAM returns to the regular routine of mobile device MS.

In the case where the result of the decision of step Sd5 was "Yes", JAM reads the stored Jar file from application body memory area 2141-21 specified by memory address "#0002" temporarily stored in RAM213, and starts Java application B on the basis of the Jar file read out (step Sd7).

With the above operations, a mobile device MS according to this embodiment can sequentially start up multiple Java applications downloaded from IP server W without waiting for the user's instructions. Accordingly, in this embodiment, there is, for example, the possibility of apportioning a series of functions over multiple Java applications.

As well, the CPU 211 in a mobile device MS according to this embodiment has become a composition that determines, based on the trusted source data described in the ADFs of each Java application, and the URI of the download origin that expresses the source of the Java applications, whether to perform startup of other Java applications following startup instructions created by one Java application. Accordingly, mobile device MS, according to this embodiment, is prevented from performing unintentional startup of Java applications for the user that might be due to Java applications provided from untrusted third parties, and information security in mobile device MS is assured.

4: Modifications

The compliant forms mentioned are exemplifications of compliant forms of the present invention and, within the above compliant forms, one can make various modifications within a scope that does not deviate from the basic ideas of the present invention. Hereinafter, instances of some modifications are described.

[4.1: First Modification]

In the compliant forms mention, the Java application's body and related data are stored in nonvolatile memory 214 in mobile device MS. In the first modification, the mobile device MS can have installed in it a module for data memory use, such as a Subscriber Identity Module (SIM), or a User Identity Module (UIM), and in any of these modules is stored Java application bodies and their related data.

Figure 18:
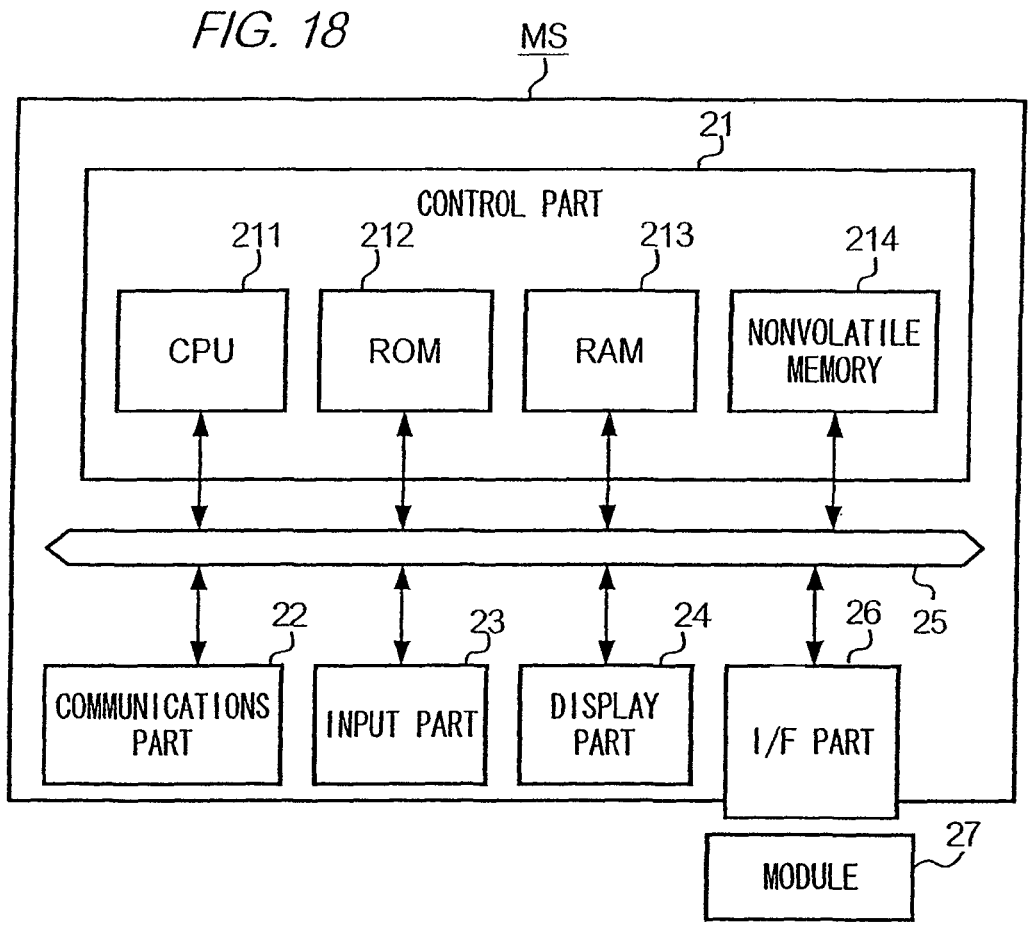
FIG. 18 is a block diagram showing a composition of a mobile device for a modified embodiment of the present invention.

FIG. 18 is a figure that shows the composition of mobile device MS according to the first modification. A mobile device MS according to the first modification, in addition to each component shown in FIG. 6, contains an I/F part 26. The control part 21 performs delivery of data between module 27 through I/F part 26.

Figure 19:
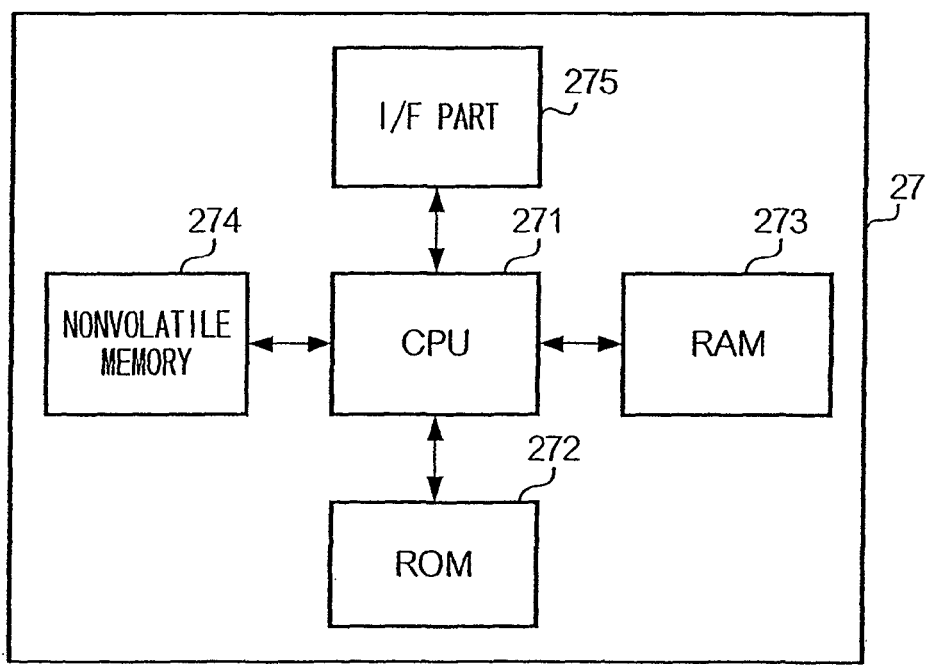
FIG. 19 is a block diagram showing a composition of a module for the modified embodiment of the present invention.

FIG. 19 is a figure that shows the composition of module 27. Module 27 contains CPU 271, ROM 272, RAM 273, nonvolatile memory 274, and I/F part 275. The I/F part 275 of module 27 relays delivery of data between CPU 271 and I/F part 26 in mobile device MS. ROM 272, aside from the various control programs to control module 27, has stored in it a program that specifies various data operations to be executed by CPU 271 using commands delivered from mobile device MS. Moreover, ROM 272 holds software to construct the Java execution environment assumed to be necessary when CPU 271 executes Java applications, Moreover, the Java execution environment constructed in module 27 may be the same as the Java execution environment (FIG. 9 reference) in control part 21 of mobile device M, or something different from the Java execution environment in control part 21 where, for example, functionality is limit based on throughput of a CPU 271 of module 27, memory quantity of RAM 273, and so on.

Nonvolatile memory 274, in addition to various memory areas that have been established in nonvolatile memory 214 of mobile device MS, contains an area to store mail addresses and numbers of affiliates.

CPU 271, due to the fact that it performs operations executed in accordance with programs stored in ROM 272 and nonvolatile memory 274, controls each component of module 27. RAM 273 is used as a work area where CPU 271 stores data temporarily.

In the first modification, the functions of CPU 211, ROM 212, RAM 213 and nonvolatile memory 214 of mobile device MS in the compliant form mentioned are carried out respectively by the CPU 271, ROM 272, RAM 273 and nonvolatile memory 274 of module 27.

I.e., due to the fact that CPU 271 performs operations in accordance with the mailer and WWW browser stored in ROM 272, it receives e-mail or HTML data that includes startup instruction tags, through communications part 22, from IP server W. As well, CPU 271 establishes a Java execution environment compliant with J2ME or the like stored in ROM272, and performs in accordance with JAM the decision operations, startup operations, and the like.

Moreover, the operations executed in accordance with, for example, the mailer and WWW browser may be executed by CPU211 of mobile device MS, and the operations executed in accordance with JAM may be executed by CPU271 of module 27.

According to this first modification, the startup operation can be performed for a Java application even in the case where the Java application has been stored in a module 27 that is freely removable from mobile device MS, such as a UIM, following startup instructions or the like created by other Java applications.

[4.2: Second Modification]

A mobile device MS in the above-mentioned compliant form, in order to determine the trustworthiness of an application specifier or startup instruction that specifies startup of a Java application, compares the transmission origin mail address of e-mail or the URI of the transmission origin of the HTML data, that indicates the source this data, or the URI of the download origin that indicates the source of the Java application that created this data, with the trusted source data. At that time, mobile terminal MS, due to the fact that it compares only the part that indicates, for example, a mail address or URI domain name, can handle as trusted transmission origins not only specific transmission origins but transmission origins across a defined range.

In the second modification, mobile terminal MS may moreover flexibly perform comparison of mail addresses or URIs. For example, the user of mobile terminal MS, by establishing any condition, such as the case where specific character string is included somewhere in the head part or in the middle part of a mail address or URI, and only in the case where it satisfies that condition, permits startup of a Java application.

[4.3: Third Modification]

In the compliant form mentioned, an e-mail address or a URI is being used as data that indicates the source of the trusted source data, the application specifier and the startup instruction. In the third modification, other information, apart from the e-mail address and URI, is used as the data that indicates the source of the data or application.

For example, in the mail system of a mobile phone device, the telephone number can be used as an e-mail address. Similarly, in a communication system according to the present invention, as the source of the data or the application, a telephone number of a mobile terminal MS or an IP server W can be used. In such a case, for example in the case where a telephone number that indicates an address of transmission origin of application specifier is unnoticed, and in the case where the transmission origin is a public telephone, it will be possible to not start the Java application specified by the application specifier. As well, if done so as to determine the transmission origin of application specifier by a telephone number, mobile device MS can discriminate whether the transmission origin of the application specifier is a landline telephone or a mobile phone device. As well, mobile device MS can, from telephone number, discriminate geographic information of transmission origin of the application specifier or telecommunications carrier. Accordingly, due to the fact that mobile device MS uses the telephone number as data that indicates the source of application specifier, in response to the geographic information of transmission origin of the application specifier or to the telecommunications carrier that relayed the transmission of the application specifier, it can determine whether to start a Java application following the application specifier.

As well, apart from telephone numbers, any other kind of information that can specify transmission origins or ranges of transmission origins, such as the IP address, may be used in present invention.

[4.4: Fourth Modification]

A mobile device MS in the fourth modification, determines whether to perform startup of the Java application in accordance with an application specifier included e-mail or HTML data received from external telecommunications equipment such as IP server W, or in accordance with startup instructions that have been created by operations executed in accordance with a Java application, based on information established beforehand by the user, in addition to contents of the trusted source data in the compliant form mentioned.

Mobile device MS, when it initially starts a Java application, displays a settings screen for permission/non-permission that concerns startup of a Java application. That settings screen includes buttons with messages like "startup by e-mail", "startup by HTML", "startup by another application", and "startup by an external device". The "startup by external device" is a setting that is concerned with whether to start Java applications based on startup instructions sent from an external device, such as a PC or a PDA, to mobile device MS. In this case, the mobile device MS comprises a communications part for performing short-distance communications, such as infrared links, Bluetooth (registered trademark) and HomeRF (Home Radio Frequency), or wired communications, and receives startup instructions from the external device through the communications part.

In the case where the user, with the above settings screen, performs selecting operation and selects, for example, the "startup by e-mail" button, the user inputs the mail addresses that are thought to be those of trusted users and untrusted users that are transmission origins of the e-mail that includes application specifiers specifying startup of the Java application. Similarly, in the case where the user selected one of the other buttons, the user inputs the mail addresses, URIs, names of Java applications, etc. The mobile device MS stores the mail addresses and the like that the user entered in nonvolatile memory 214.

When Mobile device MS receives, for example, an e-mail including application specifiers, and the transmission origin address of that e-mail is included in trusted source data, if the transmission origin address is not included in the mail addresses stored in nonvolatile memory 214 as trusted mail addresses that concerns "startup by e-mail" by the user, it does not perform operations based on the application specifiers in that e-mail.

With this fourth modification, the user can manage the operations of mobile device MS so as to not perform startup of a Java application based on e-mail or HTML data from untrusted sources, or on startup instructions created by operations of Java applications that the user does not trust.

[4.5: Fifth Modification]

In the fifth modification, when mobile device MS-receives startup instructions or the like delivered from a mailer, a WWW browser, or another Java application, it can performs not only startup of a Java application that has been downloaded from IP server W, but also startup of a native application stored in nonvolatile memory 214 or startup of a Java application installed in mobile device MS from memory devices like CD-ROM, based on the startup instructions or the like received.

[4.6: Sixth Modification]

In the sixth modification, the mobile device MS is capable of executing not only Java applications coded in Java programming language but also applications coded in languages other than Java programming language, and it decides whether to perform startup of the applications based on trusted source data similarly to the above embodiments.

[4.7: Seventh Modification]

In the seventh variant, the trusted source data is not included in the ADF for each Java application, but stored in nonvolatile memory 214 of mobile device MS as a data file that is separate from the body of the Java application. As well, plural data files each including the trusted source data for each Java application may be prepared, and a data file including the trusted source data concerning multiple Java applications may be prepared.

[4.8: Eighth Modification]

In an eighth modification, a mobile device MS determines the trustworthiness of e-mail, HTML data or startup instructions created in operations in accordance with a Java application, based on data indicating their sources and on trusted source data, in operations executed in accordance with OS instead of JAM.

[4.9: Ninth Modification]

In a ninth modification, mobile device MS can have various other configurations besides CLDC for J2ME, for example, a configuration like Connected Limited Device (CLD). As well, mobile device MS can have as profile the Mobile Information Device Profile (MIDP) and the like. Moreover, as a Java execution environment, instead of J2ME, it can have Java 2 Standard Edition (J2SE) and Java 2 Enterprise Edition (J2EE).

[4.10: Tenth Modification]

In a tenth modification, programs that perform various control functions and programs to construct a Java execution environment and the like can be installed in mobile device MS by operations of the user after the user obtains these programs from a storage media such as a CD-ROM, or through a communications network, instead of being pre-installed in ROM 212 of the mobile device MS at time of manufacture.

As well, mobile device MS, in addition to or instead of ROM 212, may have Erasable Programmable Read-Only Memory (EPROM) or the like, and overwrite programs previously stored with programs that may be acquired from a storage media such as a CD-ROM, or through a communications network, by user's operations.

[4.11: Eleventh Modification]

In an eleventh modification, instead of mobile device MS, another device may be used, such as a PC or PDA that can perform the transmitting and receiving of data through a network. In this case, instead of a mobile packet communications network MPN, a public digital network such as ISDN or the like, or a landline network, can be used.

[4.12: Twelfth Modification]

In a twelfth modification, in the ADF stored in mobile device MS, instead of trusted source data, untrusted source data is included; this data may include mail addresses or URIs that indicate untrusted data sources.

Mobile device MS decides, based on untrusted source data, whether to start another application following application specifiers included in e-mail or in HTML data, or startup instructions created by a Java application.

In other words, in the case where untrusted source data includes an e-mail transmission origin address, a HTML data transmission origin URI, or a URI of the download origin of a Java application that instructed to created startup instructions, mobile device MS does not start another Java application specified by this data.

With the twelfth modification, because the mobile device MS does perform startup of Java applications based on startup instructions or the like from sources with limited trustworthiness, the information security for mobile device MS is assured similarly to the above embodiments.

[4.13: Thirteenth Modification]

In the above embodiments, in the case where a startup instruction created by a Java application, for example Java application A, instructs a startup for another Java application, for example Java application B, mobile device MS compares the URI of the download origin of Java application A, that instructed to create the startup instruction, with trusted source data of Java application B, that is instructed to start by the startup instruction.

In the thirteenth modification, in addition to the decisions taken by the above embodiments, or instead of them, mobile device MS decides whether to perform startup by comparing the URI of the download origin of Java application B, instructed to start, with the trusted source data of Java application A, that instructed the startup.

In the thirteenth modification, the information security of mobile device MS is assured by avoiding the undesirable situation where Java application B downloaded from an untrusted source is started without the user's intent and mobile device MS sends its related information to external communications devices in operations in accordance with Java application B.

[4.14: Fourteenth Modification]

In the above embodiments, the mobile device MS comprises CPU, ROM, RAM, nonvolatile memory, etc, that are composed by a general computer, and the CPU, due to performing operations executed in accordance with a program stored in the ROM, performs startup of a Java application.

In the fourteenth modification, mobile device MS comprises multiple processors, and those multiple processors share operations of various decisions and operations of startup of applications, that are performed by the CPU in the above embodiments. In this case, the processors may be general-purpose processors, and may be special-purpose processors to implement above-mentioned operations of the mobile device MS according to this invention.

The invention claimed is:

1. A portable terminal comprising:
a memory device configured to store a plurality of applications including a first application program and a second application program, the first application program including a first process for receiving data via a network, the memory being further configured to store verified designations in relation to the second application program;
an application executor configured to execute the first application program;
an authenticator configured to execute an authentication process for authenticating a start-up instruction to start-up the second application program in response to the data received by the application executor including the start-up instruction,
the authentication process including a second process to verify a source designation of the data including the start-up instruction against the verified designations stored in the memory, the authentication process further including a third process to allow execution of the second application in response to verification of the source designation in the second process; and
an application execution control configured to start-up the second application program only when execution of the second application program is allowed by the third process.

2. The portable terminal according to claim 1, wherein the memory is further configured to store an application managing program, and the authenticator is implemented by the application managing program.

3. The portable terminal according to claim 1, wherein the memory is further configured to store an application managing program, and the application execution control is implemented by the application managing program.

4. The portable terminal according to claim 1, wherein the second application program is downloaded from a server on the network.

5. The portable terminal according to claim 1, wherein the start-up instruction comprises an identification of the second application program.

6. The portable terminal according to claim 5, wherein the identification of the second application comprises an identification of a location from which the portable terminal received the second application program.

7. The portable terminal according to claim 1, wherein the first process comprises a fourth process executable to receive an e-mail containing a direction to produce the start-up instruction.

8. The portable terminal according to claim 7, wherein the source designation comprises an e-mail source address from which the email is received, and the verified designations comprise at least one verified e-mail address.

9. The portable terminal according to claim 1, wherein the first application includes an application specifier executable to identify the second application.

10. The portable terminal according to claim 1, wherein the first application comprises a browser program which receives a page data containing a direction to produce the start-up instruction.

11. The portable terminal according to claim 10, wherein the source designation comprises a page source address from which the browser program received the page data, and the verified designations comprise at least one verification page address.

12. The portable terminal according to claim 1, wherein the first application is configured to generate, while executing, the start-up instruction without any external direction to produce the start-up instruction.

13. A portable terminal according to claim 12, wherein the source designation comprises an application source address from which the portable terminal received the first application, and the verified designations comprise at least one verification location address.

14. A method of implementing a secure execution of an application in a portable terminal, comprising:
    storing, in a memory device, a plurality of applications including a first application program and a second application program, the first application program including a first process for receiving data via a network;
    storing, in the memory, verified designations in relation to the second application program;
    executing the first application program with an application executor;
    executing, if the data received by the application executor includes a start-up instruction to start-up the second application program, an authentication process for authenticating the start-up instruction, the authentication process including a second process for verifying a source designation of the data including the start-up instruction against the verified designations stored in the memory, the authentication process further including a third process for allowing an execution of the second application if the source designation is verified in the second process; and
    starting-up of the second application program only when the execution of the second application program is allowed in the third process.

15. The method according to claim 14, further comprising downloading the second application program from a server on the network.

16. The method according to claim 14, further comprising extracting an identification of the second application program from the start-up instruction.

17. The method according to claim 16, wherein the identification of the second application program comprises an identification of a location from which the portable terminal received the second application program.

18. The method according to claim 14, wherein the first process comprises a fourth process for receiving an e-mail containing a direction to produce the start-up instruction.

19. The method according to claim 18, wherein the source designation comprises an e-mail source address from which the e-mail is received, and the verified designations comprise at least one verified e-mail address.

20. The method according to claim 14, wherein the first application includes an application specifier.

21. The method according to claim 20, wherein the second application is identified by the application specifier.

22. The method according to claim 21, further comprising extracting the verified designations stored in relation to the second application program from the second application identified by the application specifier.

23. The method according to claim 14, wherein executing the first application comprises executing a browser program which receives a page data containing a direction to the start-up instruction.

24. The method according to claim 23, wherein the source designation comprises a page source address from which the browser program received the page data, and the verified designations comprise at least one verification page address.

25. The method according to claim 14, wherein executing the first application comprises causing the first application to generate the start-up instruction without any external direction to produce the start-up instruction.

26. The method according to claim 25, wherein the source designation comprises an application source address from which the portable terminal received the first application, and the verified designations comprise at least one verification location address.

27. A portable terminal comprising:
    a memory device configured to store a plurality of applications including a first application program and a second application program, the first application program including a first process for receiving data via a network, the memory being further configured to store verification designations indicative of untrusted sources in relation to the second application program;
    an application executor configured to execute the first application program;
    an authenticator configured to execute an authentication process for authentication of a start-up instruction to start-up the second application program, the authentication process executed in response to the data received by the application executor including the start-up instruction,
    the authentication process including a second process to verify a source designation of the data including the start-up instruction against the verification designations stored in the memory; and
    an application execution control configured to start-up the second application program only when the source designation of the data including the start-up instruction is verified in the second process against the verification designations stored in the memory.

28. A method of implementing a secure execution of an application in a portable terminal, comprising:
    storing, in a memory device, a plurality of applications including a first application program and a second application program, the first application program including a first process for receiving data via a network;
    storing, in the memory, verification designations indicative of untrusted sources in relation to the second application program;
    executing the first application program with an application executor;
    executing, if the data received by the application executor includes a start-up instruction to start-up the second application program, an authentication process for authenticating the start-up instruction, the authentication process including a second process for verifying a source designation of the data including the start-up instruction against the verified designations stored in the memory, the authentication process further including a third process for allowing execution of the second application if the source designation is verified in the second process; and
    starting-up of the second application program only when the execution of the second application program is allowed in the third process.

* * * * *